(12) United States Patent
Iwami et al.

(10) Patent No.: US 9,191,223 B2
(45) Date of Patent: Nov. 17, 2015

(54) COMMUNICATION DEVICE, RECEIVING DEVICE, COMMUNICATION METHOD, AND COMMUNICATION SYSTEM

(75) Inventors: Hideki Iwami, Saitama (JP); Osamu Yoshimura, Kanagawa (JP); Tomoya Yamaura, Tokyo (JP); Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 13/396,867

(22) Filed: Feb. 15, 2012

(65) Prior Publication Data

US 2012/0254354 A1 Oct. 4, 2012

(30) Foreign Application Priority Data

Mar. 31, 2011 (JP) .................. 2011-078311

(51) Int. Cl.
*H04L 12/16* (2006.01)
*H04W 28/04* (2009.01)
*H04W 88/04* (2009.01)
*H04L 12/18* (2006.01)
*H04L 1/00* (2006.01)

(52) U.S. Cl.
CPC ............. *H04L 12/189* (2013.01); *H04W 88/04* (2013.01); *H04L 2001/0097* (2013.01); *H04W 28/04* (2013.01)

(58) Field of Classification Search
CPC ................. H04W 88/04; H04W 28/04; H04L 2001/0097; H04L 12/189
USPC .................................. 709/217, 242
See application file for complete search history.

(56) References Cited

U.S. PATENT DOCUMENTS

| 7,352,994 | B2 * | 4/2008 | Ohgami et al. ................ 455/7 |
| 8,320,969 | B2 * | 11/2012 | Takano et al. ............ 455/562.1 |
| 2002/0021669 | A1 * | 2/2002 | Kunito et al. ................ 370/235 |
| 2002/0052972 | A1 * | 5/2002 | Yim .............................. 709/245 |
| 2002/0169833 | A1 * | 11/2002 | Tani et al. ..................... 709/205 |
| 2003/0101340 | A1 * | 5/2003 | Sato .............................. 713/155 |
| 2003/0179721 | A1 * | 9/2003 | Shurmantine et al. ........ 370/315 |
| 2004/0190542 | A1 * | 9/2004 | Ono et al. ..................... 370/432 |
| 2005/0099942 | A1 * | 5/2005 | Kurihara ....................... 370/229 |
| 2006/0098616 | A1 * | 5/2006 | Kish et al. ..................... 370/338 |
| 2007/0147411 | A1 * | 6/2007 | Bijwaard et al. .............. 370/432 |
| 2008/0063078 | A1 | 3/2008 | Futenma et al. |
| 2008/0186901 | A1 * | 8/2008 | Itagaki et al. ................. 370/315 |
| 2009/0080447 | A1 * | 3/2009 | Sawada et al. ................ 370/401 |
| 2009/0098823 | A1 * | 4/2009 | Miyamoto ........................ 455/9 |
| 2009/0279848 | A1 * | 11/2009 | Taguchi .......................... 386/83 |

(Continued)

*Primary Examiner* — Joe Chacko
(74) *Attorney, Agent, or Firm* — Sony Corporation

(57) ABSTRACT

A communication device including circuitry configured to receive communication data transmitted/received between a transmitting device and a receiving device that is a transmission target of transmission data transmitted by the transmitting device by unicast, to determine whether data to be used for a process by the communication device is included in the received communication data, and to process the data to be used for the process by the communication device when the circuitry determines the data to be used for the process by the communication device is included in the received communication data. The circuitry is also configured to prevent the communication device from responding to the transmitting device, and to not relay the communication data received from the transmitting device to the receiving device, when the circuitry determines the data to be used for the process is included in the received communication data.

11 Claims, 17 Drawing Sheets

(56) References Cited

U.S. PATENT DOCUMENTS

2010/0167743 A1* 7/2010 Palanki et al. ................. 455/436
2010/0290609 A1* 11/2010 Clark et al. .............. 379/142.07
2011/0171902 A1* 7/2011 Toyoda et al. .................... 455/9
2013/0114597 A1* 5/2013 Ogisawa et al. .............. 370/390
2013/0208651 A1* 8/2013 Fujita ............................ 370/315
2013/0242030 A1* 9/2013 Kato et al. ................. 348/14.07

* cited by examiner

COMMUNICATION DEVICE, RECEIVING DEVICE, COMMUNICATION METHOD, AND COMMUNICATION SYSTEM

BACKGROUND

The present disclosure relates to a communication device, a receiving device, a communication method, and a communication system.

Nowadays, the use of an application or a service, which allows transmission/reception of content data between devices over a network such as, for example, the Internet or a LAN (Local Area Network), has been advanced.

Against such a background, a technology for transmitting image data with low delays is developed. The technology disclosed in JP 2008-28541A is given as an example of a technique for reducing delays and increasing the process efficiency when transmitting image data using a line-based codec.

SUMMARY

Among methods of transmitting data between devices that constitute a network such as the one described above are "unicast" that is the transmission of data from a source transmitting device to a specific device, and "multicast" that is the transmission of data from a source transmitting device to a plurality of devices. Herein, suppose a case where a transmitting device transmits data wirelessly to one or more devices. In such a case, if data is transmitted to each device by unicast, the number of devices to which the data can be transmitted is limited due to the limited bandwidth at which data can be transmitted, for example. Meanwhile, when the transmitting device transmits data by multicast, the data can be transmitted to more devices than when data is transmitted by unicast. However, when the transmitting device transmits data by multicast, it is difficult to re-transmit the data only to a specific device. Thus, when the transmitting device transmits data by multicast, there can exist a device that is not able to receive the data normally. Accordingly, when the transmitting device transmits data by multicast, there is a possibility that the data may not be transmitted stably.

Thus, a communication system is desired that can, when a transmitting device transmits data wirelessly, cause more devices to receive the data stably.

According to the present disclosure, there is provided a communication device including a communication unit configured to receive communication data transmitted/received between a transmitting device and a receiving device that is a transmission target of transmission data transmitted by the transmitting device by unicast, a data determination unit configured to determine data to be used for a process from among the received communication data, and a processing unit configured to process the data determined to be used for the process. The processing unit, in processing the determined data, prevents the communication unit from responding to the transmitting device or the receiving device.

According to the present disclosure, there is also provided a receiving device including a communication unit configured to receive transmission data transmitted by a transmitting device by unicast, a relay determination unit configured to determine a transmission target of the received transmission data, a relay processing unit configured to, when the transmission target of the transmission data includes a device other than the receiving device, cause the transmission data to be transmitted to the transmission target device, a data determination unit configured to, when the transmission target of the transmission data includes the receiving device, determines data to be used for a process from among the received transmission data.

According to the present disclosure, there is also provided a communication method including receiving communication data transmitted/received between a transmitting device and a receiving device that is a transmission target of transmission data transmitted by the transmitting device by unicast, determining data to be used for a process from among the received communication data, and processing the data determined to be used for the process. In processing the determined data, no response is made to the transmitting device or the receiving device.

According to the present disclosure, there is also provided a communication method including receiving transmission data transmitted by a transmitting device by unicast, determining a transmission target of the received transmission data, transmitting, if the transmission target of the transmission data includes a device other than the communication device, the transmission data to the transmission target device, determining, if the transmission target of the transmission data includes the communication device, determines data to be used for a process from among the received transmission data, and processing the data determined to be used for the process.

According to the present disclosure, there is also provided a communication system including a transmitting device, a receiving device that is a transmission target of transmission data transmitted by the transmitting device by unicast, and one or more communication devices configured to receive communication data transmitted/received between the transmitting device and the receiving device. Each communication device includes a communication unit configured to receive the communication data, a data determination unit configured to determine data to be used for a process from among the received communication data, and a processing unit configured to process the data determined to be used for the process, and the processing unit, in processing the determined data, prevents the communication unit from responding to the transmitting device or the receiving device.

According to the present disclosure, it is possible to cause more devices to receive data stably.

DETAILED DESCRIPTION OF THE EMBODIMENTS

Figure 1:
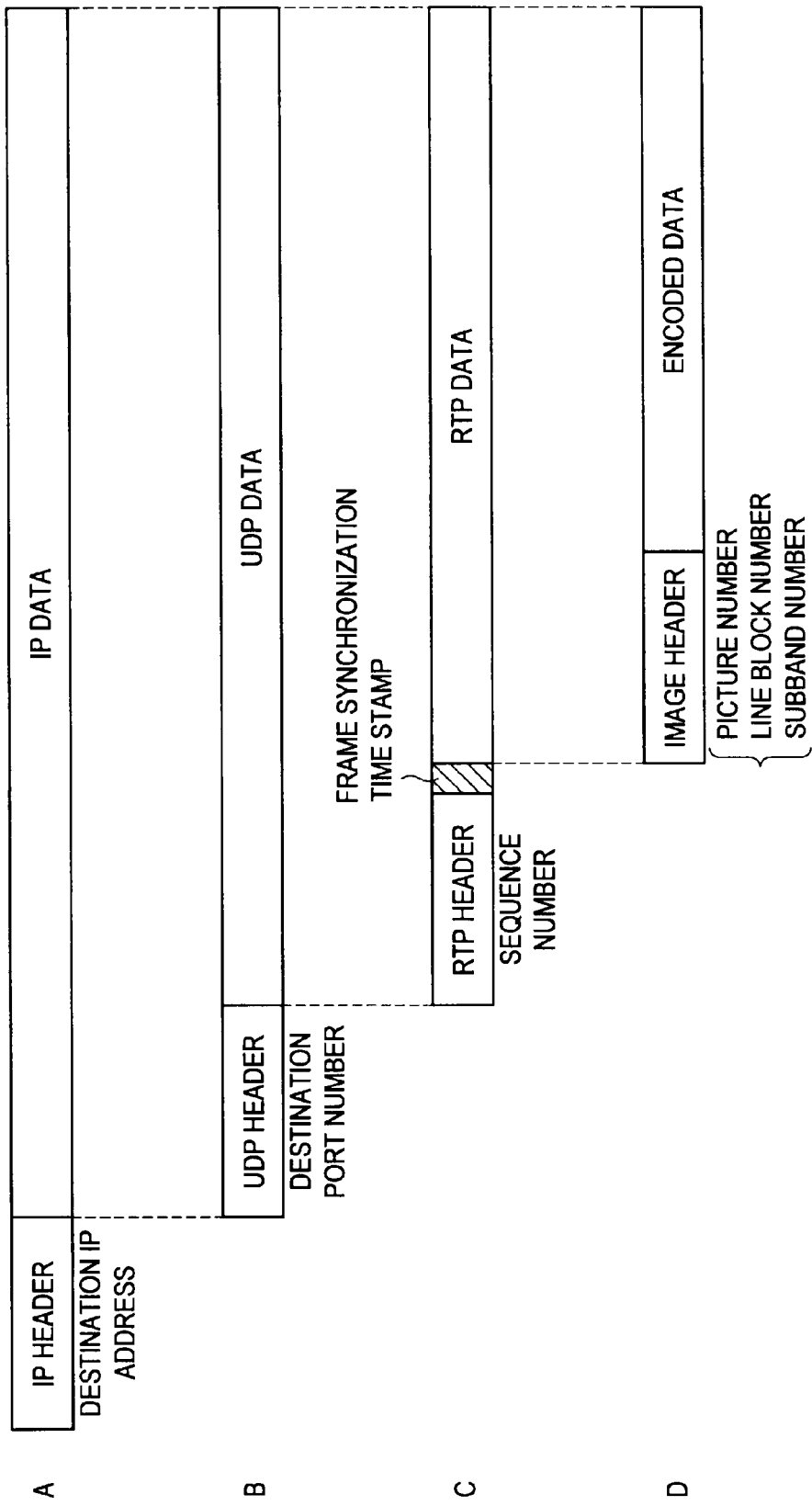
FIG. 1 is an explanatory diagram showing an example of communication data in accordance with this embodiment.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

Hereinafter, description will be made in the following order.

1. Communication Method in accordance with this Embodiment

2. Communication System in accordance with this Embodiment

3. Transmitting Device, Receiving Device, and Communication Device in accordance with this Embodiment 4. Program in accordance with this Embodiment (Communication Method in Accordance with this Embodiment)

Before describing the configuration of each device that constitutes a communication system (hereinafter also collectively referred to as a "communication system 1000") in accordance with this embodiment, a communication method in accordance with this embodiment will be described. Hereinafter, description will be made on the assumption that the communication system 1000 (to be exact, devices that constitute the communication system 1000) performs a process in accordance with the communication method in accordance with this embodiment.

As described above, suppose a case where a transmitting device transmits data wirelessly to one or more devices. In such a case, if data is transmitted to each device by unicast, the number of devices to which the data can be transmitted is limited. Meanwhile, when a transmitting device transmits data by multicast, it is difficult to re-transmit the data only to a specific device. Thus, there can exist a device that is not able to receive the data normally.

Herein, as a method for, when a transmitting device transmits data wirelessly, causing more devices to receive the data stably, there is a method of always transmitting identical data (or packet data obtained by packetizing such data, hereinafter the same) by a transmitting device by multicast a plurality of times. When a transmitting device always transmits identical data by multicast a plurality of times as described above, it becomes possible to further reduce the possibility that there may exist a device that is not able to receive the data normally. Accordingly, when a transmitting device always transmits identical data by multicast a plurality of times as described above, more devices may become able to receive the data stably.

However, when a transmitting device transmits identical data by multicast a plurality of times, a longer time would be required for the transmission of data than when transmission is performed only once, as the transmission is performed a plurality of times. Therefore, when a transmitting device transmits identical data by multicast a plurality of times, the efficiency of data transmission from the transmitting device to the transmission target devices would decrease.

[Overview of Communication Method in Accordance with this Embodiment]

Herein, in the communication system 1000 in accordance with this embodiment, a device that transmits transmission data (hereinafter also referred to as a "transmitting device 100") transmits the transmission data wirelessly to a transmission target device (hereinafter also referred to as a "receiving device 200") by multicast (for example, see FIG. 2).

Herein, examples of the transmission data in accordance with this embodiment include content data (or data including content data) representing an image (a moving image or a still image, hereinafter the same) and/or audio (including music, hereinafter the same). Hereinafter, an image and/or audio may also be collectively referred to as "content." Note that the transmission data in accordance with this embodiment is not limited to the content data. For example, the transmission data in accordance with this embodiment may be various data such as text data, update data for updating an application, or control data for controlling software or hardware (or data including such data).

Devices (hereinafter also referred to as "communication devices 300") other than the receiving device 200 that constitute the communication system 1000 receive communication data transmitted/received between the transmitting device 100 and the receiving device 200, and determine the data to be used for a process from among the received communication data. More specifically, the communication device 300 receives communication data transmitted/received between the transmitting device 100 and the receiving device 200, and, even when the received communication data is not addressed to (destined for) the communication device 300, determines the data to be used for a process from among the received communication data. That is, although a typical device that performs unicast communication discards the received communication data if the received communication data is not address to (destined for) the device, the communication device 300 does not discard the received communication data (or part thereof) even if the received communication data is not addressed to (destined for) the communication device 300 without determining the data to be used for a process.

Herein, examples of the communication data in accordance with this embodiment include transmission data transmitted from the transmitting device 100 and a response signal (response data) transmitted from the receiving device 200. In addition, examples of the response signal in accordance with this embodiment include ACK (ACKnowledgement) and NACK (Negative ACKnowledgement).

FIG. 1 is an explanatory diagram showing an example of the communication data in accordance with this embodiment. Herein, FIG. 1 shows an example of packetized communication data. More specifically, FIG. 1 shows an example of a frame format of an IP (Internet Protocol) packet including image data.

As shown by symbol A in FIG. 1, an IP packet includes an IP header and IP data, for example. The IP header includes, for example, channel control information related to the control of a communication channel based on an IP protocol such as a destination IP address (an IP address of the transmission destination). In addition, as shown by symbol B in FIG. 1, the IP data includes a UDP (User Datagram Protocol) header and UDP data, for example. Herein, the UDP is a protocol of a transport layer of an OSI (Open Systems Interconnection) reference model used for the distribution of image data representing a moving image on which the real-time properties are put weight or audio data. The UDP header includes, for example, a destination port number (a port number of the transmission destination) that is application identification information. In addition, as shown by symbol C in FIG. 1, the UDP data includes, for example, a RTP (Real-time Transport Protocol) header and RTP data. The RTP header includes, for example, reproduction control information for ensuring the real-time properties of data streams such as a sequence number. Herein, the reproduction control information may include a frame-synchronization time stamp for synchronizing a process such as a reproducing process among a plurality of devices as shown by symbol C in FIG. 1, for example. In addition, as shown by symbol D in FIG. 1, the RTP data includes a header of image data (hereinafter referred to as "image header") and encoded data that is an image compressed on the basis of a line-based codec, for example. The image header includes, for example, a picture number, a line block number (or a line number when encoding is performed in units of a single line), a subband number, and an identifier representing the type of data (an example of identification information described below). Note that the image header may, for example, separately include a picture header assigned to each picture and a line block header assigned to each line block. In addition, in the example shown in FIG. 1, encoded data corresponding to a payload is the data to be processed by the communication device 300.

Examples of the communication data in accordance with this embodiment include an IP packet (packet data) with the structure shown in FIG. 1, for example. Note that the communication data in accordance with this embodiment is not limited to the structure shown in FIG. 1. For example, the communication data in accordance with this embodiment may be packet data supporting any protocol other than IP, or non-packetized data. Needless to say, the payload included in the communication data in accordance with this embodiment is not limited to the image data.

Examples of the method of determining the data to be used for a process in the communication data 300 include a method of determining the data to be used for the process on the basis of identification information, which indicates the type of data, included in the received communication data.

More specifically, for example, the communication device 300 detects identification information (e.g., an identifier included in the image header shown by symbol D in FIG. 1 or an identifier included in each header shown by symbols A to C in FIG. 1) from the received communication data. When identification information is detected, the communication device 300, using the information to be processed, which has set therein the type of data to be processed, and the detected identification information, determines if the information to be processed has set therein the type of data indicated by the detected identification information. If it is determined that the information to be processed has set therein the type of data indicated by the detected identification information, the communication device 300 determines that the payload of the received communication data is the data to be used for a process. If it is not determined that the information to be processed has set therein the type of data indicated by the detected identification information, the communication device 300 discards the received communication data, for example.

Herein, examples of the information to be processed in accordance with this embodiment include a database on which the types of data to be processed are recorded. The information to be processed has set therein, for example, data corresponding to the transmission data transmitted from the transmitting device 100, such as content data, text data, update data, control data, or the like, as the data to be processed. In addition, although response data (control data related to communication) such as, for example, ACK or NACK is the data necessary for the transmitting device 100 that transmits transmission data and the like, it is not necessary for the communication device 300. Therefore, the information to be processed does not have set therein response data such as, for example, ACK or NACK, as the data to be processed. In addition, although the communication device 300 uses the information to be processed that is stored in a storage unit (described below) or the like of the communication device 300, for example, the communication device 300 may also use information to be processed that has been acquired from an external device such as a server.

The communication device 300 determines the data to be used for a process using the aforementioned method, for example. Note that the method for determining the data to be used for a process in the communication device 300 in accordance with this embodiment is not limited to the aforementioned method. For example, when the communication data includes device specifying information indicating a specific device or a specific device group, the communication device 300 may selectively determine the data to be used for a process on the basis of the device specifying information. Herein, examples of the device specifying information in accordance with this embodiment include a MAC address (Media Access Control address) and a group ID. However, the device specifying information in accordance with this embodiment is not limited thereto. For example, the communication system 1000 may use any information (data) as the device specifying information as long as the information can specify a specific device or a specific device group.

More specifically, when the communication device 300 matches the device indicated by the device specifying information or when the communication device 300 is included in the device group indicated by the device specifying information, for example, the communication device 300 determines the data to be used for a process on the basis of the identification information. Meanwhile, when the communication device 300 does not match the device indicated by the device specifying information or when the communication device 300 is not included in the device group indicated by the device specifying information, for example, the communication device 300 does not perform determination of data on the basis of the identification information. The communication device 300 can selectively determine the data to be used for a process by performing a determination on the basis of the device specifying information as described above.

After determining the data to be used for a process, the communication device 300 processes the data determined to be used for the process, and does not process the data not determined to be used for a process. That is, the communication device 300 selectively processes predetermined data to be processed among the received communication data. In addition, the communication device 300 may discard data other than the predetermined data to be processed among the received communication data. Further, as the communication device 300 processes predetermined data included in the communication data that is not addressed to (destined for) the communication device 300, the communication device 300 does not respond (e.g., transmit ACK, NACK, processing results, or the like) to the transmitting device 100 or the receiving device 200.

Herein, the process performed by the communication device 300 may be, when the communication device 300 has determined content data as the data to be used for a process, a process of reproducing the determined content data, a process of displaying an image in accordance with image data (e.g., an example of the content data) on a display screen, or a process of causing an audio output device such as a speaker to output audio in accordance with audio data (an example of the content data), for example. Note that the process performed by the communication device 300 in accordance with this embodiment is not limited thereto. For example, when the communication device 300 has determined update data as the data to be used for a process, the communication device 300 updates corresponding software such as an application or an OS (Operating System) using the update data. That is, the communication device 300 performs a process in accordance with the determined data.

As described above, the communication device 300 in accordance with this embodiment performs (1) a process of receiving communication data, (2) a process of determining the data to be used for a process from among the received communication data, and (3) a process of processing the data determined to be used for the process. In addition, the communication device 300, when performing the aforementioned process (3), does not respond to the transmitting device 100 or the receiving device 200 performing unicast communication.

As described above, in the communication system 1000, the transmitting device 100 and the receiving device 200 perform unicast communication, and one or more communication devices 300 receive communication data transmitted/received between the transmitting device 100 and the receiving device 200, and then perform a process on the basis of the received communication data. That is, in the communication system 1000, unicast wireless communication is not performed between the transmitting device 100 and the communication device 300 or between the receiving device 200 and the communication device 300. Accordingly, when wireless communication is performed using a given bandwidth in the communication system 1000, data can be transmitted to more communication devices 300 than when the transmitting device transmits data wirelessly to each device by unicast (hereinafter also referred to as "conventional unicast wireless communication") as described above.

As each communication device 300 receives communication data transmitted/received between the transmitting device 100 and the receiving device 200 by unicast, the communication device 300 can receive transmission data that has been re-transmitted from the transmitting device 100 to the receiving device 200 (a specific device). Accordingly, the communication system 1000 can further reduce the possibility that there may exist a device that is not able to receive data normally than when the transmitting device transmits data wirelessly to each device by multicast (hereinafter referred to as "conventional multicast wireless communication") as described above.

In the communication system 1000, the transmitting device does not always transmit identical data a plurality of times unlike a case where the transmitting device always transmits identical data by multicast a plurality of times as described above, but the transmitting device 100 selectively re-transmits data upon occurrence of an error. That is, in the communication system 1000, transmission efficiency that is about equal to the transmission efficiency of data from a transmitting device to a specific transmission target device in the conventional unicast wireless communication can be realized. Accordingly, the communication system 1000 can improve the transmission efficiency of data from the transmitting device 100 to a transmission target device (the receiving device 200 and one or more communication devices 300) than when the transmitting device always transmits identical data by multicast a plurality of times as described above.

Further, in the communication system 1000, when the communication device 300 is arranged at a position where the communication environment between the transmitting device 100 and the communication device 300 is better than the communication environment between the transmitting device 100 and the receiving device 200, it becomes possible to reduce the possibility of occurrence of a "circumstance where the communication device 300 is not able to receive transmission data even through the receiving device 200 receives the transmission data." Thus, when the communication device 300 is arranged at a position where the communication environment between the transmitting device 100 and the communication device 300 is better than the communication environment between the transmitting device 100 and the receiving device 200, the communication system 1000 can further reduce the possibility that there may exist a device that is not able to receive data normally.

Herein, examples of the method of making the communication environment between the transmitting device 100 and the communication device 300 better than the communication environment between the transmitting device 100 and the receiving device 200 include a method of arranging the receiving device 200 at a position where errors frequently occur when the receiving device 200 communicates with the transmitting device 100 (e.g., a position where the frequency of transmission of NACK from the receiving device 200 to the transmitting device 100 is equal to or greater than a predetermined threshold). As described above, when the receiving device 200 is arranged at a position where errors frequently occur when the receiving device 200 communicates with the transmitting device 100, the frequency of re-transmission of transmission data from the transmitting device 100 to the receiving device 200 will increase. Accordingly, in the communication system 1000, it is possible to reduce the possibility of occurrence of a "circumstance where the communication device 300 is not able to receive transmission data even though the receiving device 200 receives the transmission data." Note that the method of making the communication environment between the transmitting device 100 and the communication device 300 better than the communication environment between the transmitting device 100 and the receiving device 200 is not limited to the aforementioned example. For example, it is possible to, after appropriately arranging the receiving device 200 at a plurality of positions (candidate arrangement positions) and causing it to communicate with the transmitting device 100, arrange the receiving device 200 at a position where errors occurred the most in communication with the transmitting device 100.

Thus, the communication system 1000 that performs a process in accordance with the communication method in accordance with this embodiment can cause more devices to receive data stably.

Hereinafter, a specific example of a process in accordance with the communication method in accordance with this embodiment will be described in conjunction with an exemplary configuration of the communication system 1000 in accordance with this embodiment. Note that an exemplary configuration of each of the transmitting device 100, the receiving device 200, and the communication device 300 that constitute the communication system 1000 will be described later.

(Communication System in Accordance with this Embodiment)

(I) Communication System in Accordance with the First Embodiment

Figure 2:
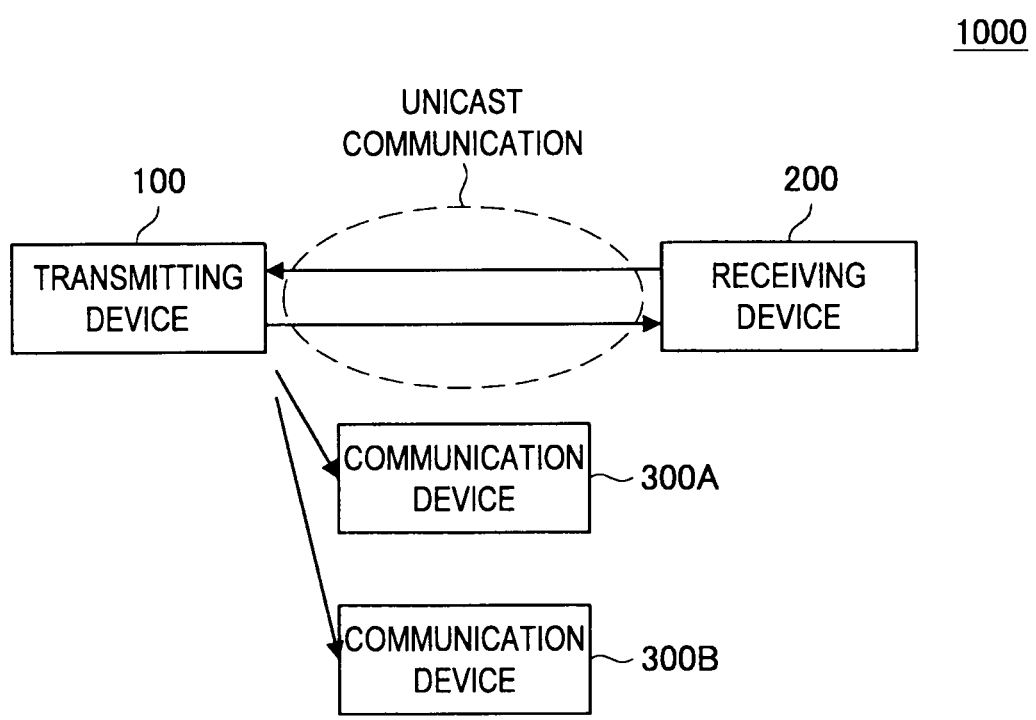
FIG. 2 is an explanatory diagram showing an exemplary configuration of a communication system in accordance with a first embodiment.

FIG. 2 is an explanatory diagram showing an exemplary configuration of the communication system 1000 in accordance with the first embodiment. The communication system 1000 has the transmitting device 100, the receiving device 200, and the communication devices 300A and 300B. Herein, although FIG. 2 shows a configuration having two communication devices 300: the communication device 300A and the communication device 300B, the configuration of the communication system 1000 in accordance with the first embodiment is not limited thereto. For example, the communication system 1000 in accordance with the first embodiment may have a single communication device 300 or three or more communication devices 300. Hereinafter, the communication system 1000 in accordance with the first embodiment will be described with reference to an example in which the communication system 1000 in accordance with the first embodiment has two communication devices 300: the communication device 300A and the communication device 300B.

In the communication system 1000, the transmitting device 100 and the receiving device 200 wirelessly communicate with each other by unicast, and the communication devices 300A and 300B (hereinafter also collectively referred to as "communication devices 300") receive and process communication data transmitted/received between the transmitting device 100 and the receiving device 200.

Figure 3:
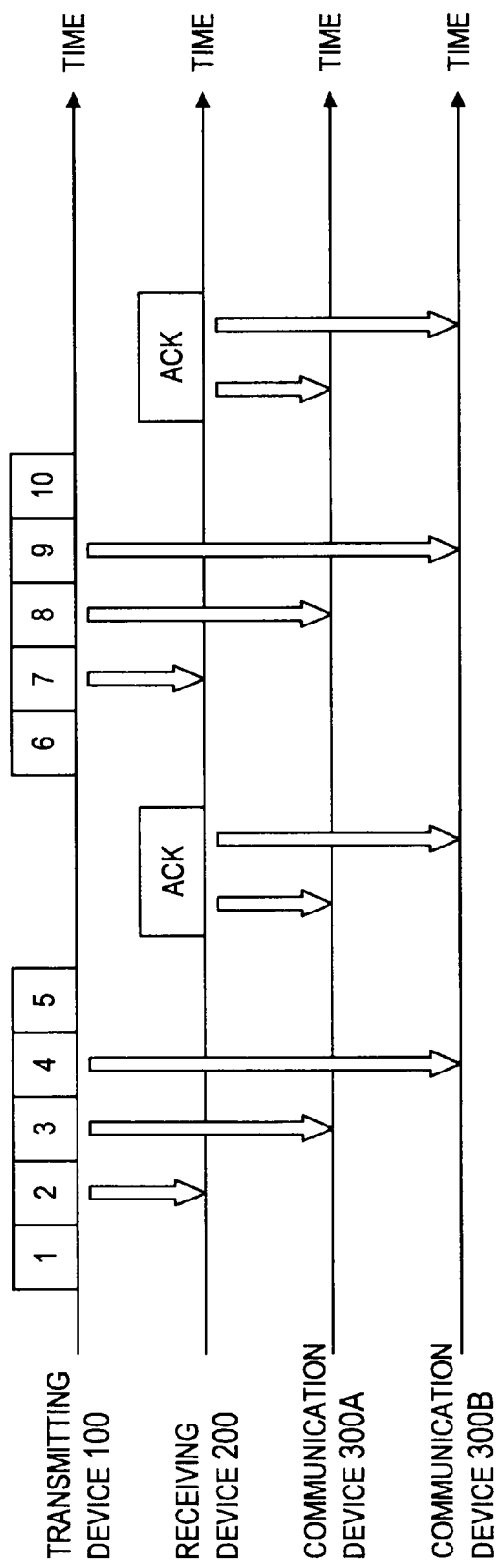
FIG. 3 is an explanatory diagram showing an overview of communication performed by the communication system in accordance with the first embodiment.

FIG. 3 is an explanatory diagram showing an overview of communication performed by the communication system 1000 in accordance with the first embodiment. Herein, FIG. 3 shows a case where wireless communication performed by the communication system 1000 is wireless LAN communication based on the IEEE 802.11n standard. More specifically, FIG. 3 shows an example in which the transmitting device 100 transmits transmission data using an aggregation function, defined by the IEEE 802.11n standard, for collectively transmitting a plurality of MSDUs (Mac Service Data Units) as a single packet.

The transmitting device 100 handles five MSDUs as a single packet, for example, and transmits the packet (an example of transmission data) to the receiving device 200 by uicast. At this time, a sequence number is added to each MSDU (e.g., a sequence number is incremented by one when a MSDU is transmitted). In addition, the receiving device 200, upon receiving a packet transmitted from the transmitting device 100 normally, transmits a response signal (e.g., Block ACK) indicating the successful reception to the transmitting device 100. Although not shown in FIG. 3, when the receiving device 200 does not receive a packet transmitted from the transmitting device 100 normally, the receiving device 200 transmits a response signal (e.g., NACK) indicating the unsuccessful reception. In such a case, the transmitting device 100 re-transmits a packet corresponding to the response signal indicating the unsuccessful reception to the receiving device 200.

Note that unicast communication performed between the transmitting device 100 and the receiving device 200 in the communication system 1000 in accordance with this embodiment is not limited to the aforementioned example. For example, the transmitting device 100 may transmit a single MSDU as a single packet without using the aggregation function. Alternatively, the receiving device 200 may, for example, return a Delayed ACK response by assuming that it has received a plurality of pieces of data at a time, or return Immediate ACK for returning a single response to a single packet.

Each of the communication devices 300A and 300B receives a packet transmitted from the transmitting device 100 and a response signal transmitted from the receiving device 200 (the aforementioned process (1) (a process of receiving communication data)). Then, each of the communication devices 300A and 300B performs the aforementioned process (2) (a process of determining the data to be used for a process from among the received communication data), and the aforementioned process (3) (a process of processing the data determined to be used for the process). In addition, each of the communication devices 300A and 300B, in performing the aforementioned process (3), does not respond to the transmitting device 100 or the receiving device 200, which are performing unicast communication, as shown in FIG. 3.

Further, the transmitting device 100 that has received a response signal transmitted from the receiving device 200, upon determining the completion of transmission of a packet corresponding to MSDUs with the sequence numbers 1 to 5 on the basis of the response signal, transmits a packet corresponding to MSDUs with the sequence numbers 6 to 10 to the receiving device 200. Then, the receiving device 200, upon receiving the packet transmitted from the transmitting device 100, transmits a response signal corresponding to the result of reception to the transmitting device 100.

Each of the communication devices 300A and 300B receives a packet transmitted from the transmitting device 100 and a response signal transmitted from the receiving device 200 (the aforementioned process (1)), and performs the aforementioned processes (2) and (3). In addition, each of the communication devices 300A and 300B, in performing the aforementioned process (3), does not respond to the transmitting device 100 or the receiving device 200 performing unicast communication, as shown in FIG. 3.

In the communication system 1000 in accordance with the first embodiment, when the process shown in FIG. 3 is performed, for example, transmission data transmitted from the transmitting device 100 is transmitted to the receiving device 200 and each communication device 300.

As shown in FIG. 3, in the communication system 1000 in accordance with the first embodiment, unicast communication is performed between the transmitting device 100 and the receiving device 200, and each communication device 300 receives the communication data transmitted/received between the transmitting device 100 and the receiving device 200, and then performs a process on the basis of the received communication data. That is, in the communication system 1000 in accordance with the first embodiment, a process in accordance with the aforementioned communication method in accordance with this embodiment is realized.

Thus, with the configuration shown in FIG. 2, for example, it is possible to realize a communication system that can cause more devices to receive data stably.

Note that the communication system that can perform a process in accordance with the communication method in accordance with this embodiment is not limited to the topology shown in FIG. 2. For example, although FIG. 2 shows an example in which the transmission target of the transmission data of the transmitting device 100 is the receiving device 200 that can wirelessly and directly communicate with the transmitting device 100, the communication system in accordance with this embodiment may have a topology in which the transmitting device 100 transmits transmission data to the target receiving device 200 via one or more relay devices. When transmission data is transmitted via one or more relay devices as described above, it becomes possible for the communication system 1000 in accordance with this embodiment to more extend the communication distance over which the transmission data can be transmitted. Thus, next, a communication system in which a relay device is interposed between the transmitting device 100 and the receiving device 200 will be described as a communication system in accordance with the second embodiment (hereinafter also referred to as a "communication system 2000").

(II) Communication System in Accordance with the Second Embodiment

Figure 4:
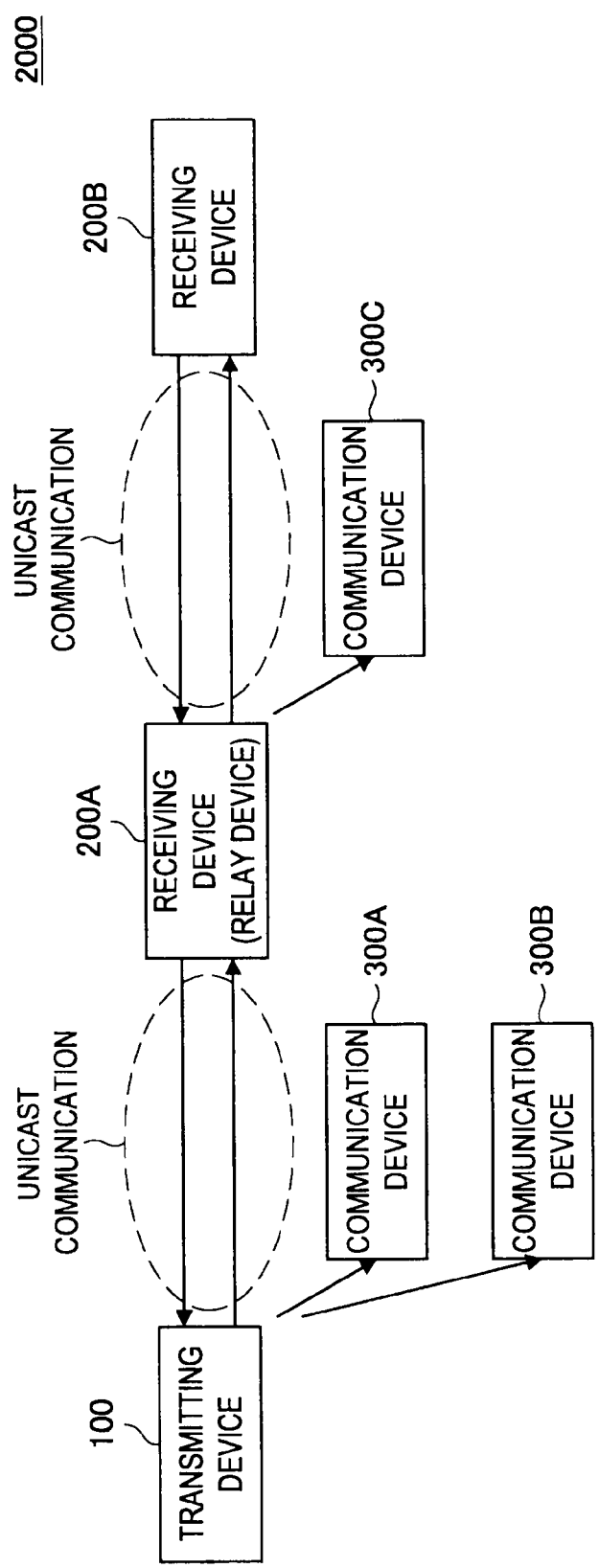
FIG. 4 is an explanatory diagram showing an exemplary configuration of a communication system in accordance with a second embodiment.

FIG. 4 is an explanatory diagram showing an exemplary configuration of the communication system 2000 in accordance with the second embodiment. The communication system 2000 has a transmitting device 100, receiving devices 200A and 200B, and communication devices 300A, 300B, and 300C.

Herein, FIG. 4 shows a configuration in which the receiving device 200A serves as a relay device that relays the wireless communication between the transmitting device 100 and the receiving device 200B. Although FIG. 4 shows a configuration having two receiving devices 200: the receiving device 200A and the receiving device 200B, the configuration of the communication system 2000 in accordance with the second embodiment is not limited thereto. For example, the communication system 2000 in accordance with the second embodiment may have three or more receiving devices 200. When the communication system 2000 has three or more receiving devices 200, each receiving device 200 can serve as a relay device that relays the wireless communication between the transmitting device 100 and the other receiving device 200.

In addition, although FIG. 4 shows a configuration having two communication devices 300: the communication device 300A and the communication device 300B as the communication device 300 that receives communication data transmitted/received between the transmitting device 100 and the receiving device 200A as in FIG. 2, the configuration of the communication system 2000 in accordance with the second embodiment is not limited thereto. For example, like the communication system 1000 in accordance with the first embodiment, the communication system 2000 in accordance with the second embodiment may have a single communication device 300 as the communication device 300 that receives communication data transmitted/received between the transmitting device 100 and the receiving device 200A, or have three or more communication devices 300.

Further, although FIG. 4 shows a configuration having the communication device 300C as the communication device 300 that receives communication data transmitted/received between the receiving device 200A and the receiving device 200B, the configuration of the communication system 2000 in accordance with the second embodiment is not limited thereto. For example, the communication system 2000 in accordance with the second embodiment may have a plurality of communication devices 300 as the communication device 300 that receives communication data transmitted/received between the receiving device 200A and the receiving device 200B.

In the communication system 2000 shown in FIG. 4, the devices that constitute the communication system 2000 may be grouped. When grouping is performed as described above, it becomes possible to improve the security such that a process can be executed only to a specific group, for example, in the communication system 2000.

Hereinafter, the communication system 2000 in accordance with the second embodiment will be described with reference to the configuration shown in FIG. 4, as an example. Hereinafter, description will be made of a case where the transmitting device 100 transmits transmission data to the receiving device 200B via the receiving device 200A, that is, a case where the receiving device 200A serves as a relay device.

The transmitting device 100 transmits transmission data to the receiving device 200A by unicast. Herein, a header (e.g., an IP header shown by symbol A in FIG. 1) of the transmission data has set therein an IP address of the receiving device 200B, for example.

Like the receiving device 200 in accordance with the first embodiment shown in FIG. 2, the receiving device 200A transmits a response signal in response to the reception of the transmission data to the transmitting device 100.

As in the communication devices 300A and 300B in accordance with the first embodiment shown in FIG. 2, each of the communication devices 300A and 300B receives communication data transmitted/received between the transmitting device 100 and the receiving device 200B (the aforementioned process (1) (a process of receiving communication data)). Then, each of the communication devices 300A and 300B performs the aforementioned process (2) (a process of determining the data to be used for a process from among the received communication data), and the aforementioned process (3) (a process of processing the data determined to be used for the process). In addition, each of the communication devices 300A and 300B, in performing the aforementioned process (3), does not respond to the transmitting device 100 or the receiving device 200 performing unicast communication, as shown in FIG. 3.

In addition, the receiving device 200A determines the transmission target of the received transmission data. Herein, the receiving device 200A, if an IP address set in the header of the transmission data includes an IP address corresponding to the receiving device 200A, determines that the receiving device 200A is included in the transmission target of the transmission data. Meanwhile, the receiving device 200A, if an IP address set in the header of the transmission data includes an IP address other than the IP address corresponding to the receiving device 200A, determines that there exists another device that is the transmission target of the transmission data. Note that it is needless to mention that the process of determining the transmission target with the receiving device 200A is not limited to the aforementioned example.

When the transmission target of the transmission data is determined to include a device other than the receiving device 200A, the receiving device 200A transmits (re-transmits) the transmission data to the transmission target device by unicast. That is, when the transmission target of the transmission data is determined to include a device other than the receiving device 200A, the receiving device 200A relays the received transmission data. In the example shown in FIG. 4, the receiving device 200A re-transmits the transmission data to the receiving device 200B by unicast. Herein, the receiving device 200A may re-transmit the transmission data to the transmission target device using the same bandwidth as that used for the wireless communication with the communication device 300 or re-transmit the transmission data to the transmission target device using a different bandwidth from that used for the wireless communication with the communication device 300.

When the transmission target of the transmission data is determined to include the receiving device 200A, the receiving device 200A determines the data to be used for a process from among the received transmission data. Then, the receiving device 200A processes the data determined to be used for the process. Herein, examples of the data determination process of the receiving device 200A include the aforementioned process (2) in accordance with the communication device 300 (the process of determining the data to be used for a process from among the received communication data). In addition, examples of the processing the determined data with the receiving device 200A include the aforementioned process (3) in accordance with the communication device 300 (the process of processing the data determined to be used for the process).

As described above, the receiving device 200 in accordance with the second embodiment performs, for example, (i) a process of receiving transmission data transmitted from the transmitting device 100 by unicast, (ii) a process of determining the transmission target of the received transmission data, (iii) a relay process of re-transmitting the transmission data to the transmission target device, (iv) a process of selectively determining the data to be used for a process from among the received transmission data, and (v) a process of processing the data determined to be used for the process. When the receiving device 200 performs such processes (i) to (v), it becomes possible to realize relay of the transmission data in addition to unicast communication between the receiving device 200 and the transmitting device 100 as in the communication system 1000 in accordance with the first embodiment. Accordingly, when the receiving device 200 performs such processes (i) to (v), a communication system, which can more extend the communication distance over which the transmission data can be transmitted, can be realized.

Upon receiving the transmission data re-transmitted from the receiving device 200A, the receiving device 200B transmits a response signal in response to the reception of the transmission data to the receiving device 200A like the receiving device 200 in accordance with the first embodiment shown in FIG. 2.

Like the communication devices 300A and 300B in accordance with the first embodiment shown in FIG. 2, the communication device 300C receives communication data transmitted/received between the receiving device 200A and the receiving device 200B (the aforementioned process (1) (a process of receiving communication data)). Herein, as shown in FIG. 4, for example, the transmission data received by the communication device 300 in accordance with this embodiment is not limited to the transmission data transmitted from the transmitting device 100, and may be transmission data re-transmitted from another device (the receiving device 200A in the example shown in FIG. 4).

Then, the communication device 300C performs the aforementioned process (2) (a process of determining the data to be used for a process from among the received communication data) and the process (3) (a process of processing the data determined to be used for the process). In addition, the communication device 300C, in performing the aforementioned process (3), does not respond to the receiving device 200A or the receiving device 200B performing unicast communication, as shown in FIG. 3.

As shown in FIG. 4, in the communication system 2000 in accordance with the second embodiment, unicast communication is performed between the transmitting device 100 and the receiving device 200A, and each of the communication devices 300A and 300B receives the communication data transmitted/received between the transmitting device 100 and the receiving device 200A, and performs a process on the basis of the received communication data. That is, the transmitting device 100, the receiving device 200A, and the communication devices 300A and 300B that constitute the communication system 2000 in accordance with the second embodiment perform a process in accordance with the aforementioned communication method in accordance with this embodiment as in the communication system 1000 in accordance with the first embodiment.

In addition, as shown in FIG. 4, in the communication system 2000 in accordance with the second embodiment, the receiving device 200A selectively re-transmits transmission data by unicast to the receiving device 200B (an example of another device) that is the transmission target of the transmission data, by performing the aforementioned processes (i) to (v) on the basis of the received transmission data. Then, the communication device 300C receives communication data transmitted/received between the receiving device 200A and the receiving device 200B, and performs a process on the basis of the received communication data. That is, the receiving device 200A (the relay device), the receiving device 200B, and the communication device 300C that constitute the communication system 2000 in accordance with the second embodiment perform a process in accordance with the aforementioned communication method in accordance with this embodiment, as in the communication system 1000 in accordance with the first embodiment.

Accordingly, in the communication system 2000 in accordance with the second embodiment shown in FIG. 4, transmission data is transmitted from the transmitting device 100 to the receiving device 200B via the receiving device 200A serving as a relay device. In addition, each of the communication devices 300A, 300B, and 300C performs the aforementioned process (1) (a process of receiving communication data) to process (3) (a process of processing the data determined to be used for the process) in accordance with the communication method in accordance with this embodiment. That is, the communication system 2000 can transmit data to more communication devices 300 than when the conventional unicast wireless communication is used, and can further reduce the possibility that there may exist a device that is not able to receive data normally than when the conventional multicast wireless communication is used.

Thus, the communication system 2000 in accordance with the second embodiment can cause more devices to receive data stably while extending the communication distance over which the transmission data can be transmitted.

[Examples of Application of Communication System 1000]

The communication system 1000 in accordance with this embodiment can cause more devices to receive data stably with the configuration of the communication system 1000 in accordance with the first embodiment shown in FIG. 2 or the configuration of the communication system 2000 in accordance with the second embodiment shown in FIG. 4, for example. Thus, next, a case where data used for the processes of the receiving device 200 and the communication device 300, which is included in the transmission data transmitted from the transmitting device 100, is content data representing an image or audio will be described as an example of the application of the communication system 1000 in accordance with this embodiment. Herein, the content data may be data representing an image, which is captured by an imaging device or the like in real time or audio, or may be data representing a non-real-time image or audio stored in a recording medium or the like in advance.

Hereinafter, a process performed by the communication system 1000 in accordance with this embodiment will be described more specifically with reference to an example in which the communication system 1000 has the configuration of the communication system 2000 in accordance with the second embodiment shown in FIG. 4. In addition, hereinafter, an example will be described in which the transmitting device 100 transmits transmission data including the image data shown in FIG. 1, for example, and the receiving device 200 displays an image indicated by the image data included in the transmission data on a display screen.

[1] First Example of Process Performed by Communication System 1000

Figure 5:
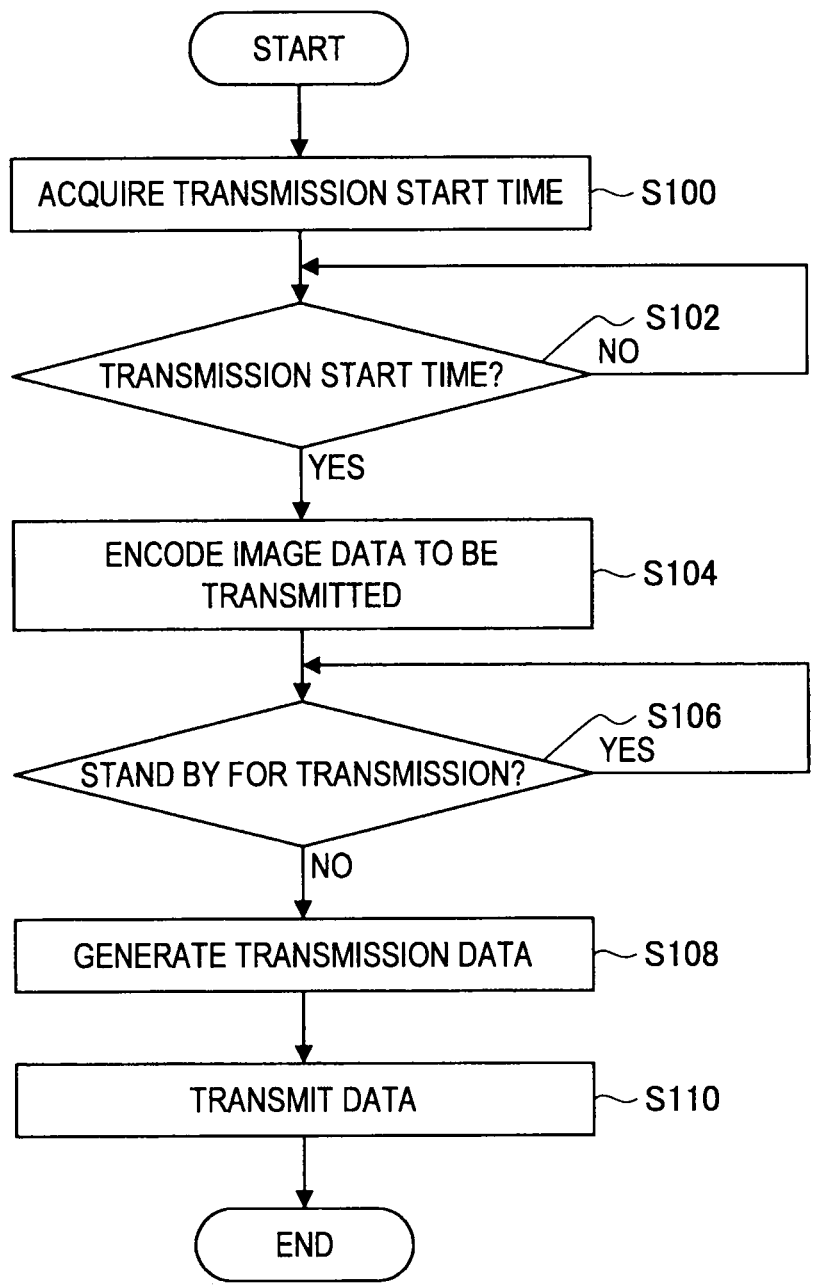
FIG. 5 is an explanatory diagram illustrating a first example of a process performed by the communication system in accordance with this embodiment.
Figure 6:
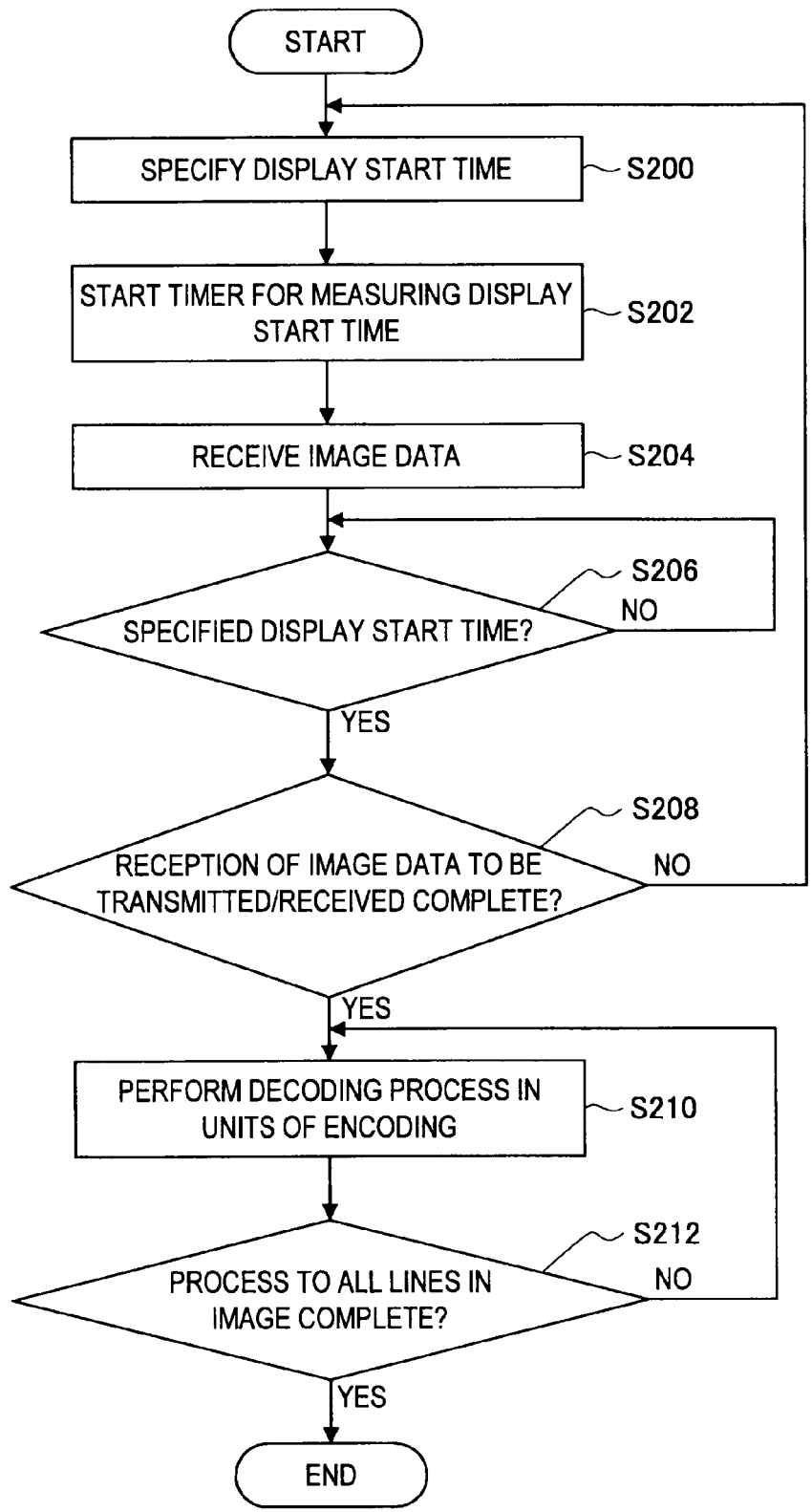
FIG. 6 is an explanatory diagram illustrating the first example of the process performed by the communication system in accordance with this embodiment.
Figure 7:
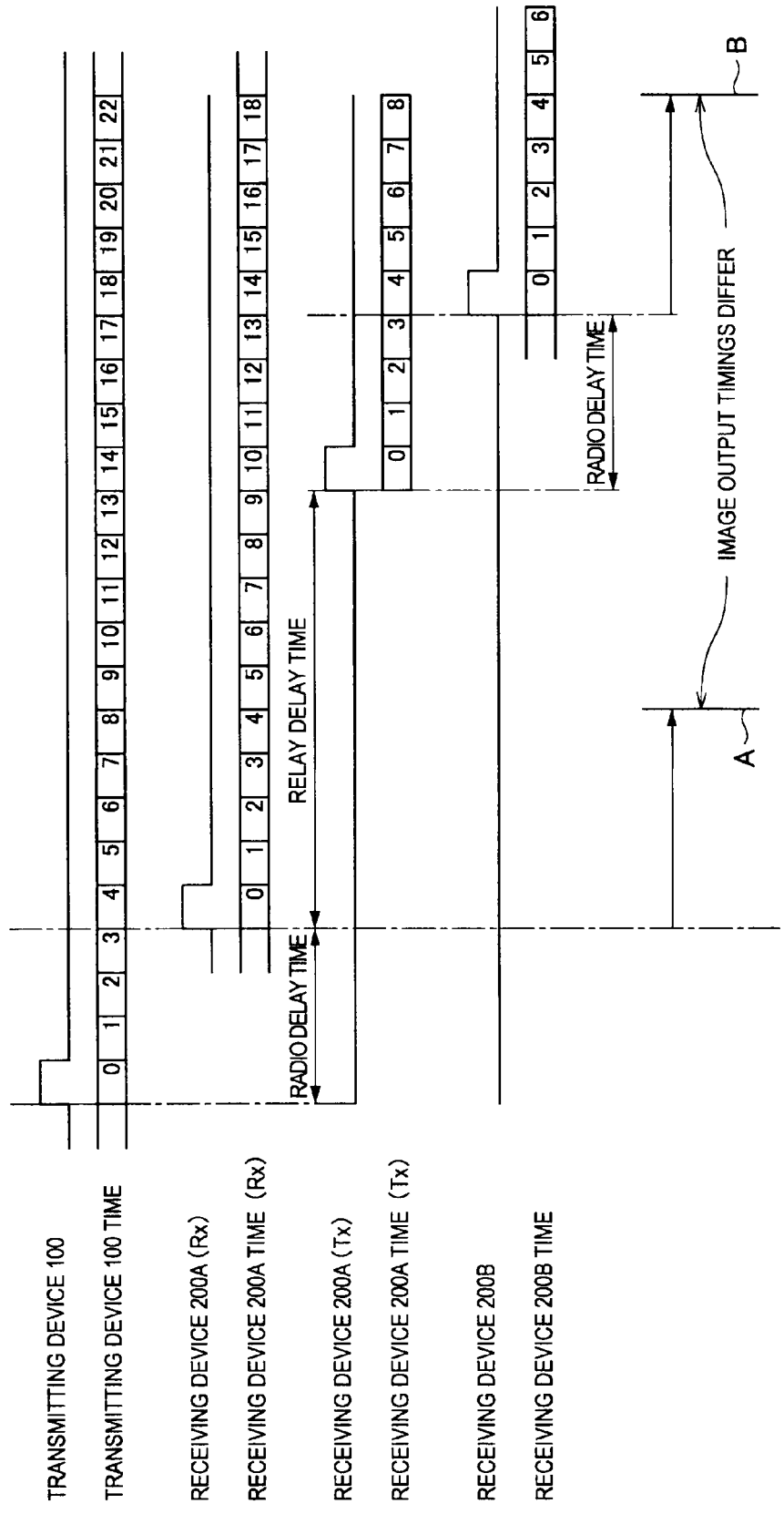
FIG. 7 is an explanatory diagram illustrating the first example of the process performed by the communication system in accordance with this embodiment.

FIGS. 5 to 7 are explanatory diagrams illustrating a first example of a process performed by the communication system 1000 in accordance with this embodiment. Herein, FIG. 5 shows an example of a process performed by the transmitting device 100. FIG. 6 shows an example of a process performed by the receiving device 200. In addition, FIG. 7 shows an example of a timing chart of the communication system 1000.

First, an example of a process performed by the transmitting device 100 will be described with reference to FIG. 5.

The transmitting device 100 acquires the transmission start time of the transmission data (S100). Herein, although the transmitting device 100 acquires the transmission start time from a transmission start indicating signal received together with the image data from an external device such as an imaging device that has generated the image data, for example, the process in step S100 is not limited thereto. For example, the transmitting device 100 may acquire the transmission start time from an operation signal in accordance with a user operation transmitted from an operation unit (described below) or use a predefined time as the transmission start time.

Upon acquiring the transmission start time in step S100, the transmitting device 100 determines if the current time matches the transmission start time (S102). If the current time is not determined to match the transmission start time in step S102, the transmitting device 100 does not advance the process until when the current time is determined to match the transmission start time.

If the current time is determined to match the transmission start time in step S102, the transmitting device 100 encodes the image data to be transmitted (S104). Herein, the transmitting device 100 encodes the image data in units of encoding: N (N is an integer not less than 1) lines in one field, for example. Examples of the encoding process performed by the transmitting device 100 include a process using wavelet transformation, but it is needless to mention that the encoding process performed by the transmitting device 100 is not limited to a process using wavelet transformation.

After the image data is encoded in step S104, the transmitting device 100 determines if it should stand by for transmission (S106). Herein, the transmitting device 100 determines if preparation for transmission is complete on the basis of the communication channel and the progress of the process related to the transmission, for example, and if the preparation for transmission is not determined to be complete, determines that the transmitting device 100 should stand by for transmission.

If it is determined that the transmitting device 100 should stand by for transmission in step S106, the transmitting device 100 does not advance the process until when it is not determined that the transmitting device 100 should stand by for transmission. If it is determined that the transmitting device 100 should stand by for transmission in step S106, the image data encoded in step S104 is stored into RAM (Random Access Memory) or the like of the transmitting device 100, for example.

If it is not determined that the transmitting device 100 should stand by for transmission in step S106, the transmitting device 100 generates transmission data including image data such as the one shown in FIG. 1, for example (S108), and transmits the generated transmission data to the receiving device 200 as the transmission target or the receiving device 200 serving as a relay device (S110).

The transmitting device 100 transmits the transmission data by performing the process shown in FIG. 5, for example. Note that it is needless to mention that the process performed by the transmitting device 100 in accordance with this embodiment is not limited to the process shown in FIG. 5.

Next, an example of a process performed by the receiving device 200 will be described with reference to FIG. 6.

The receiving device 200 specifies a display start time (S200), and starts a timer for measuring the display start time (S202). Herein, the receiving device 200, for example, writes data indicating the display start time to a predetermined address such as a storage unit (described below) of the receiving device 200 in response to the reception of a packet, a beacon, or the like transmitted from the transmitting device 100. At this time, the receiving device 200 may transmit an instruction, which indicates the transmission of a transmission start indicating signal, to an external device such as an imaging device that transmits the transmission start indicating signal to the transmitting device 100.

The receiving device 200 receives transmission data transmitted from the transmitting device 100, thereby receiving image data included in the transmission data (S204). The receiving device 200 records the received image data on RAM or the like of the receiving device 200, for example. Although not shown in FIG. 6, the receiving device 200 transmits a response signal in response to the reception of the transmission data to the transmitting device 100.

The receiving device 200 determines if the current time matches the display start time specified in step S200 (S206). If the current time is not determined to match the display start time in step S206, the receiving device 200 does not advance the process until when the current time is determined to match the display start time.

If the current time is not determined to match the display start time in step S206, the receiving device 200 determines if the reception of the image data to be transmitted/received is complete on the basis of the image data stored in the RAM or the like, for example (S208). If the reception of the image data is not determined to be complete in step S208, the receiving device 200 performs the processes of from step S200 again, and re-schedules the transmission/reception timing of the image data.

If the reception of the image data is determined to be complete in step S208, the receiving device 200 performs a decoding process in units of encoding on the image data stored in the RAM or the like, for example (S210).

When the process in step S210 is complete, the receiving device 200 determines if the process to all lines (e.g., lines in the horizontal direction) in the image is complete (S212).

If the process is not determined to be complete in step S212, the receiving device 200 repeats the processes of from step S210. Meanwhile, if the process is determined to be complete in step S212, the receiving device 200 terminates the process related to the reception of transmission data.

By performing the process shown in FIG. 6, for example, the receiving device 200 enters a state in which the receiving device 200 is able to receive transmission data and display on a display screen an image indicated by the image data included in the transmission data. Note that it is needless to mention that the process performed by the receiving device 200 in accordance with this embodiment is not limited to the process shown in FIG. 6.

In the communication system 1000, for example, the transmitting device 100 performs the process shown in FIG. 5 and the receiving device 200 performs the process shown in FIG. 6, whereby synchronization of the processes is achieved between the transmitting device 100 and the receiving device 200. In addition, in the communication system 1000, for example, the receiving device 200 (e.g., the receiving device 200A), which serves as a relay device, performs the process shown in FIG. 5, and another receiving device 200 (e.g., the receiving device 200B), which performs unicast communication with the receiving device 200 serving as the relay device, performs the process shown in FIG. 6, whereby synchronization of the processes can be achieved between the receiving device 200 serving as a relay device and another receiving device 200.

As shown in FIG. 7, when the aforementioned process in accordance with the first example is performed in the communication system 1000, the timing of the time (Tx) 0 of the receiving device 200A and the timing of the time 0 of the receiving device 200B in the communication system 1000 become timings that are synchronized while being shifted by a radio delay time. Herein, with regard to the process in accordance with the first example of the communication system 1000, the synchronization process between the transmitting device 100 and the receiving device 200A and the synchronization process between the receiving device 200A and the receiving device 200B are performed independently. Therefore, as shown by symbols A and B in FIG. 7, the image output timing of the receiving device 200A differs from that of the receiving device 200B. That is, when a process in accordance with the first example is performed in the communication system 1000, the timings corresponding to VSYNC of image data differ due to the aforementioned difference in output timing. Thus, the output timing of an image (as well as audio) also differs from device to device.

[2] Second Example of Process Performed by Communication System 1000

When a process in accordance with the aforementioned first example is performed, a phenomenon can occur in which the content output timing differs from device to device, that is, the content output timing is shifted from device to device, as shown in FIG. 7, for example. Herein, such timing difference can be generated due to a delay related to the radio transmission or a delay related to the relay process of the receiving device 200A serving as the relay device, for example. Hereinafter, the delay time related to the radio transmission will be referred to as "radio delay time," and the delay time related to the relay process will be referred to as "relay delay time."

In the communication system 1000, transmission data is transmitted wirelessly. Thus, the receiving device 200 and the communication device 300 can be moved more easily than when the transmission data is transmitted by wire, for example. Therefore, when the communication device 300C shown in FIG. 4 is moved to a position similar to the position of the communication device 300A, for example, the communication data received by the communication device 300C switches from the communication data between the receiving device 200A and the receiving device 200B to the communication data between the transmitting device 100 and the receiving device 200A (so-called handoff occurs). When the communication data received by the communication device 300C is switched as described above, discrepancy can occur in the content that is output as a result of the content data having been processed by the communication data 300C, by an amount corresponding to a delay related to the relay process, for example. Herein, when discrepancy occurs in the content as described above, there is a possibility that a user may recognize distortion of an image displayed on the display screen or distortion of audio output from an audio output device, for example.

Thus, in order to provide content with high reproduction quality to a user of the receiving device 200 and a user of the communication device 300 in the communication system 1000, it is more desirable to synchronize the content output timing in the communication system 1000.

Thus, as a process in accordance with a second example of the communication system 1000, a process that can synchronize the content output timing in the communication system 1000 will be exemplarily described.

Figure 8:
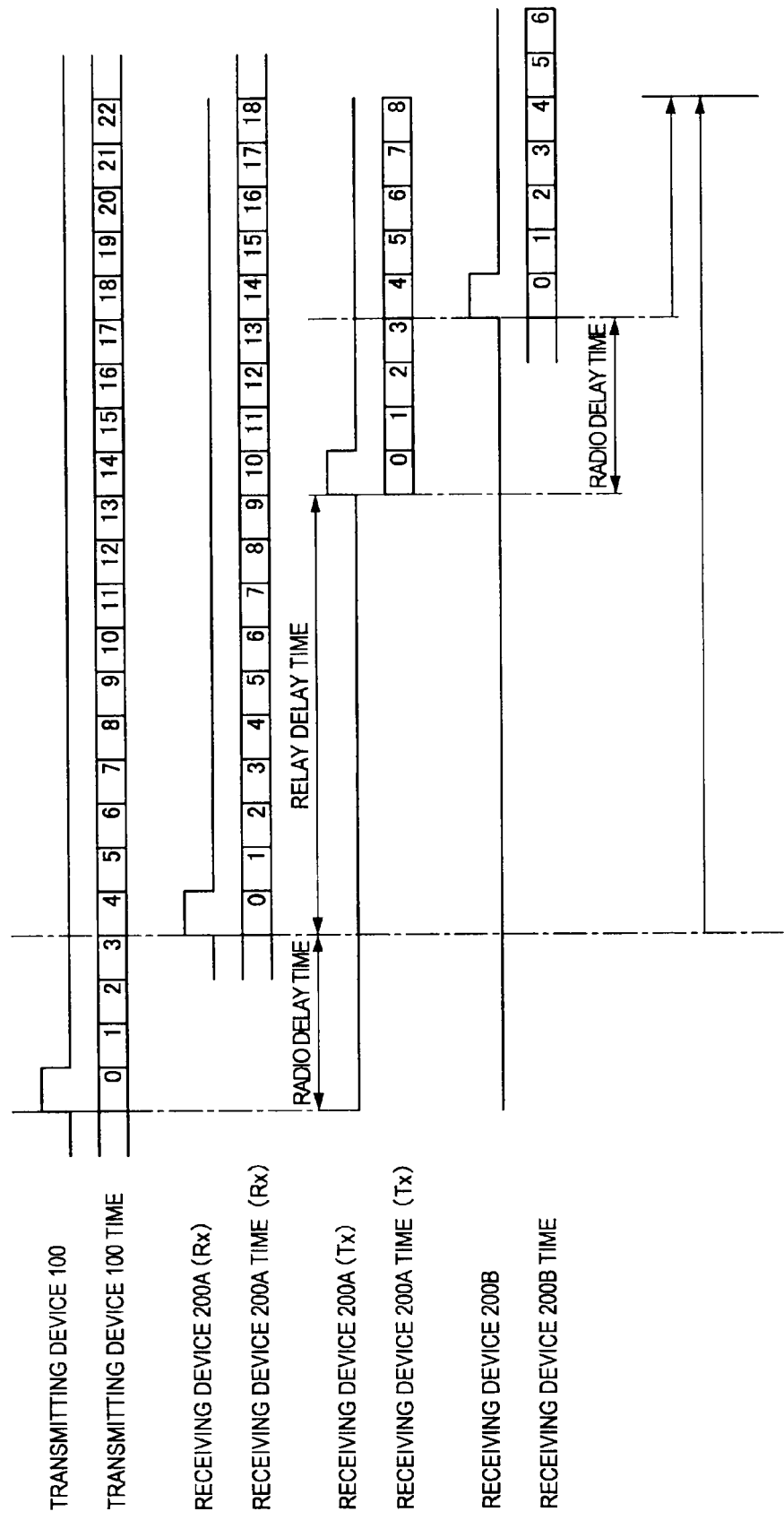
FIG. 8 is an explanatory diagram illustrating a second example of a process performed by the communication system in accordance with this embodiment.

FIG. 8 is an explanatory diagram illustrating a second example of a process performed by the communication system 1000 in accordance with this embodiment. Herein, FIG. 8 shows a method of determining, with the receiving device 200A, the display start timing of the receiving device 200A by taking into account the relay delay time of the receiving device 200A and the radio delay time between the receiving device 200A and the receiving device 200B.

More specifically, in the communication system 1000, the receiving device 200A synchronizes the display start timing of the receiving device 200A with the display start timing of the receiving device 200B by adding the "display start timing wait time" calculated in accordance with Formula 1 below to the display start timing determined by the process of synchronizing the transmitting device 100 with the receiving device 200A (a process similar to the aforementioned process in accordance with the first example of the communication system 1000).

The display start timing wait time=(the relay delay time of the receiving device 200*A*)+(the radio delay time between the receiving device 200*A* and the receiving device 200*B*)     (Formula 1)

When the display start timing of the receiving device 200A is synchronized with that of the receiving device 200B as described above, timings corresponding to VSYNC of the image data are also synchronized. Accordingly, even when the destination of the transmission data is switched on the basis of radio information (e.g., RSSI (e.g., Receive Signal Strength Indication) information, packet error information, or packet delays), the content will have no discrepancy.

Herein, the receiving device 200A is able to acquire the time required for the relay process of the receiving device 200A as the relay delay time. In addition, the receiving device 200A is also able to, when another receiving device 200 serving as a relay device further exists in the communication system 1000, identify the relay delay time in the entire communication system 1000 by acquiring from the other receiving device 200 relay delay time information indicating the relay delay time of the other receiving device 200.

In addition, the receiving device 200A, for example, identifies the radio delay time using radio delay time information indicating the radio delay time measured in advance. Herein, the receiving device 200A identifies the radio delay time using radio delay time information stored in a storage unit (described below) of the receiving device 200A, but the method of acquiring the radio delay time information with the receiving device 200A is not limited thereto. For example, the receiving device 200A may acquire the radio delay time information from a detachable external recording medium or an external device such as a server.

Note that the method of identifying the radio delay time in the communication system 1000 in accordance with this embodiment is not limited to the aforementioned method that uses the radio delay time information. For example, in the communication system 1000, each of the transmitting device 100, the receiving device 200, and the communication device 300 that constitute the communication system 1000 can calculate the radio delay time.

Figure 9:
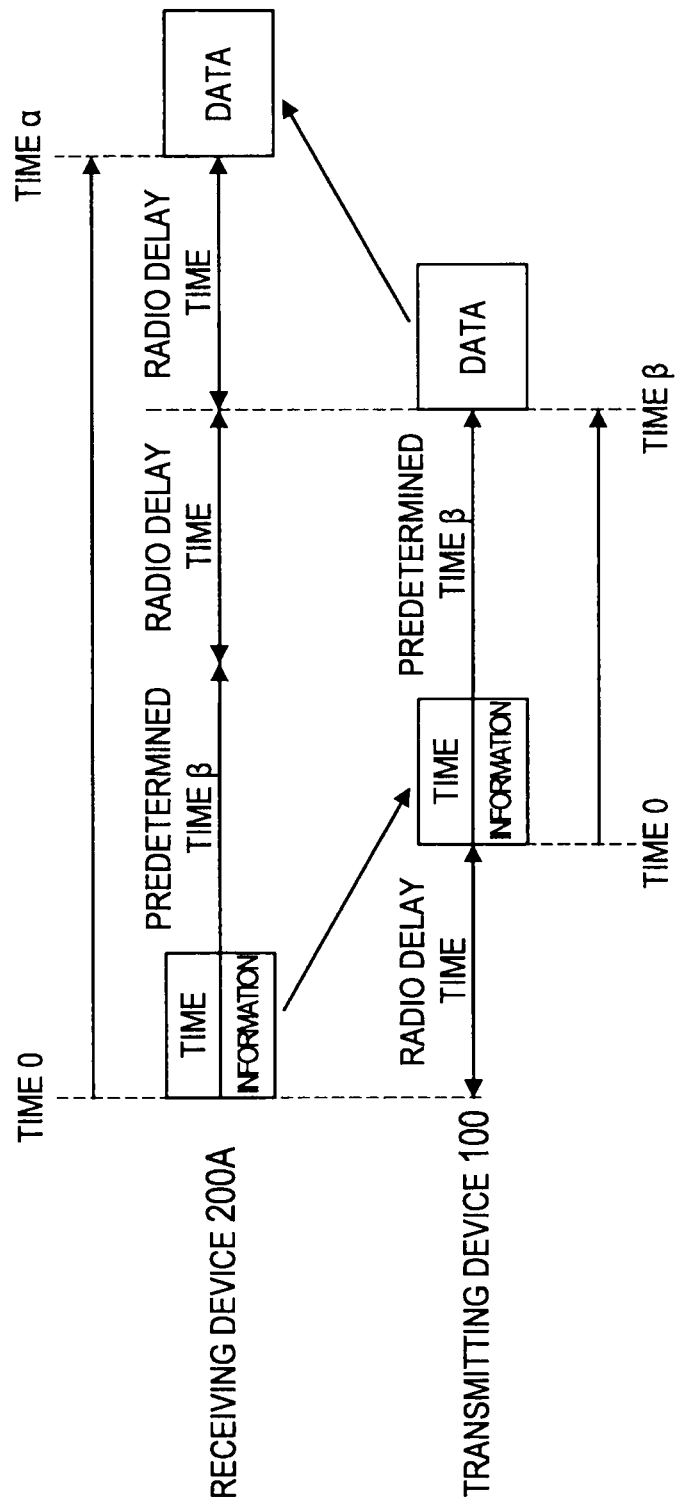
FIG. 9 is an explanatory diagram showing an exemplary method of identifying the radio delay time in the communication system in accordance with this embodiment.

FIG. 9 is an explanatory diagram showing an exemplary method of identifying the radio delay time in the communication system 1000 in accordance with this embodiment. Herein, FIG. 9 shows an example in which the receiving device 200A calculates the radio delay time between the transmitting device 100 and the receiving device 200A. Although not described below, each of the transmitting device 100, the receiving device 200, and the communication device 300 that constitute the communication system 1000 in accordance with this embodiment can calculate the radio delay time between the devices by performing a process in accordance with a method described below.

The receiving device 200A transmits time information indicating the reference time of the receiving device 200A (e.g., information indicating the time 0 in the receiving device 200A) to the transmitting device 100. Upon receiving the time information, the transmitting device 100 adjusts the time of the transmitting device 100 on the basis of the time information. Examples of the time adjustment performed by the transmitting device 100 on the basis of the time information include synchronizing, by the transmitting device 100, the time of the transmitting device 100 with the time indicated by the time information. At the aforementioned point in time, the difference between the absolute time of the receiving device 200A and that of the transmitting device 100 is the radio delay time. However, as the transmitting device 100 does not have the absolute time, it is difficult to grasp the radio delay time. That is, the transmitting device 100 and the receiving device 200A operate while having a difference of the radio delay time.

Next, the transmitting device 100 transmits data (a packet) having added thereto time information from the viewpoint of the transmitting device 100 to the receiving device 200A. The data may be, for example, transmission data including content data such as the one shown in FIG. 1 or data for transmitting the time information. Alternatively, the data may be an ACK packet (e.g., Immediate ACK or Delayed ACK) exchanged on a radio layer, for example.

The receiving device 200A calculates the radio delay time on the basis of the reception time α of the aforementioned data transmitted from the transmitting device 100 and the time β indicated by the time information included in the received data.

$$\text{Radio Delay Time}=(\alpha-\beta)/2 \quad\quad\quad (\text{Formula 2})$$

As described above, the receiving device 200A serving as a relay device transmits time information indicating the time of the receiving device 200A to the transmitting device 100. Then, the receiving device 200A can calculate the radio delay time (communication delay time) by receiving data such as transmission data transmitted from the transmitting device 100, the time of which has been adjusted on the basis of the time information, and using the received data.

In addition, the receiving device 200A can, by performing a process similar to the process shown in FIG. 9 between the receiving device 200A and the receiving device 200B, calculate the radio delay time between the receiving device 200A and the receiving device 200B.

Although a process of calculating the radio delay time between the transmitting device 100 and the receiving device 200A and a process of calculating the radio delay time between the receiving device 200A and the receiving device 200B are exemplarily shown above, the process of calculating the radio delay time in the communication system 1000 in accordance with this embodiment is not limited thereto. For example, the communication device 300 that constitutes the communication system 1000 can, by performing a process similar to that shown in FIG. 9 between the communication device 300 and a device that transmits transmission data (e.g., the transmitting device 100 or the receiving device 200A serving as a relay device), calculate the radio delay time (communication delay time) between the communication device 300 and the device that transmits transmission data.

When the aforementioned process (3) (a process of processing the data determined to be used for the process) is performed after the radio delay time calculated by the communication device 300 has elapsed, synchronization of the content output timing is achieved in the entire communication system 1000.

Further, the communication device 300 may perform the aforementioned process (3) by acquiring from the receiving device 200A communication delay time information indicating the communication delay time between the receiving device 200A serving as a relay device (a transmitting device other than the transmitting device 100) and the receiving device 200B that is the transmission target of the transmission data. Herein, examples of the communication delay time information in accordance with this embodiment include relay delay time information indicating the relay delay time of the receiving device 200 serving as a relay device and information indicating the radio delay time calculated in the receiving device 200. In addition, the communication delay time information in accordance with this embodiment can also be understood as information that controls the timing of starting a process in each device that constitutes the communication system 1000 (timing control information).

When the communication device 300 performs the aforementioned process (3) after the delay time indicated by the communication delay time information (e.g., the relay delay time indicated by the relay delay time information and the radio delay time) has elapsed, for example, it becomes possible to further synchronize the content output timing in the entire communication system 1000.

Herein, the communication delay time information may be, for example, included in part of the data format of the transmission data and transmitted to each device that constitutes the communication system 1000, or be transmitted to each device that constitutes the communication system 1000 using a Multicast packet, a Multiple-Unicast packet, or the like.

Figure 10:
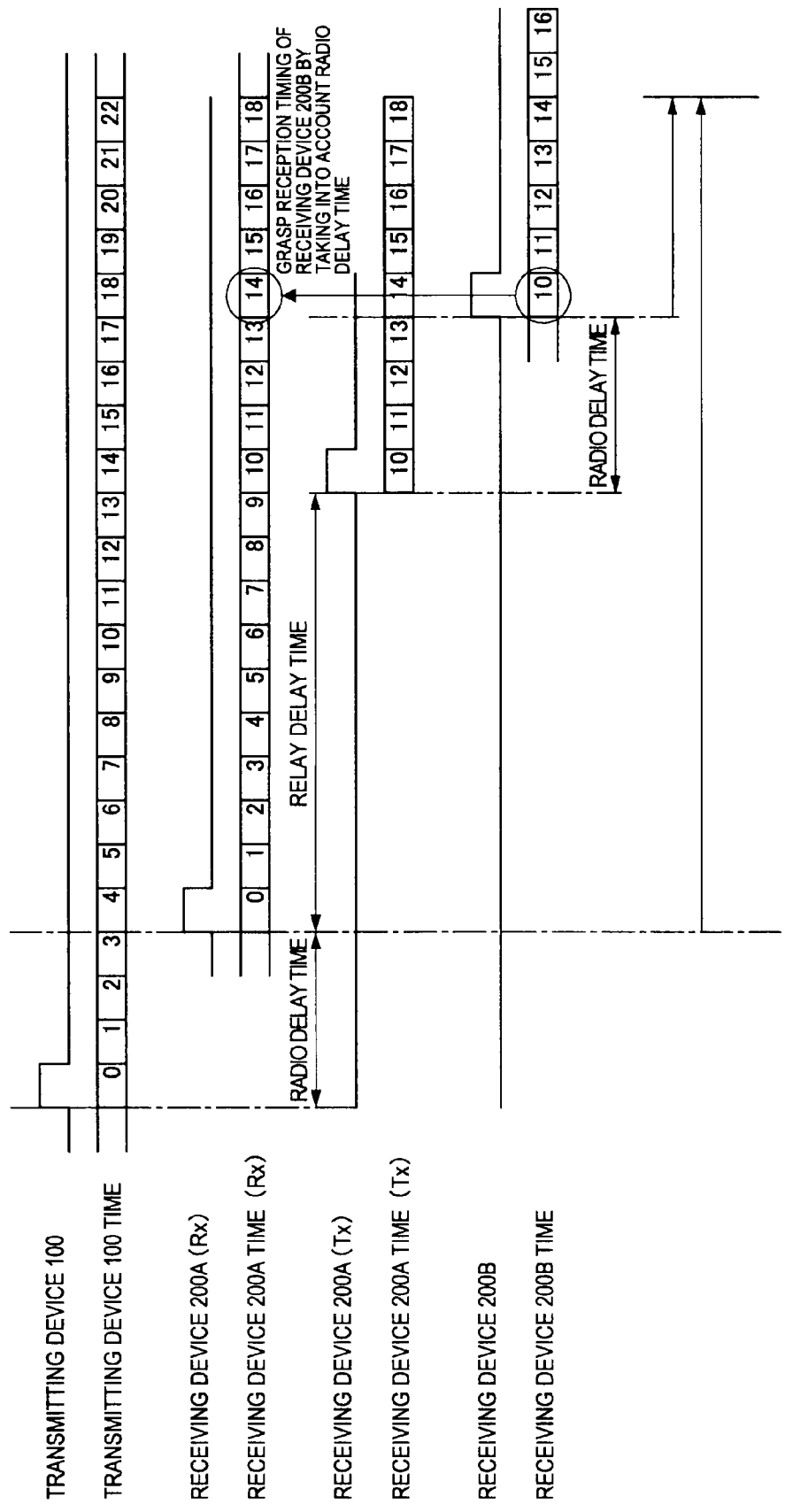
FIG. 10 is an explanatory diagram illustrating a second example of a process performed by the communication system in accordance with this embodiment.

FIG. 10 is an explanatory diagram illustrating a second example of a process performed by the communication system 1000 in accordance with this embodiment. Herein, FIG. 10 shows an example of a process of the communication system 1000 when the receiving device 200A uses the radio delay time calculated by performing a process similar to the process shown in FIG. 9.

As described above, the receiving device 200A can calculate the radio delay time between the receiving device 200A and the receiving device 200B by performing a process similar to that shown in FIG. 9 between the receiving device 200A and the receiving device 200B. Accordingly, as shown in FIG. 10, it is possible to synchronize the display start timing of the receiving device 200A with the display start timing of the receiving device 200B.

Figure 11:
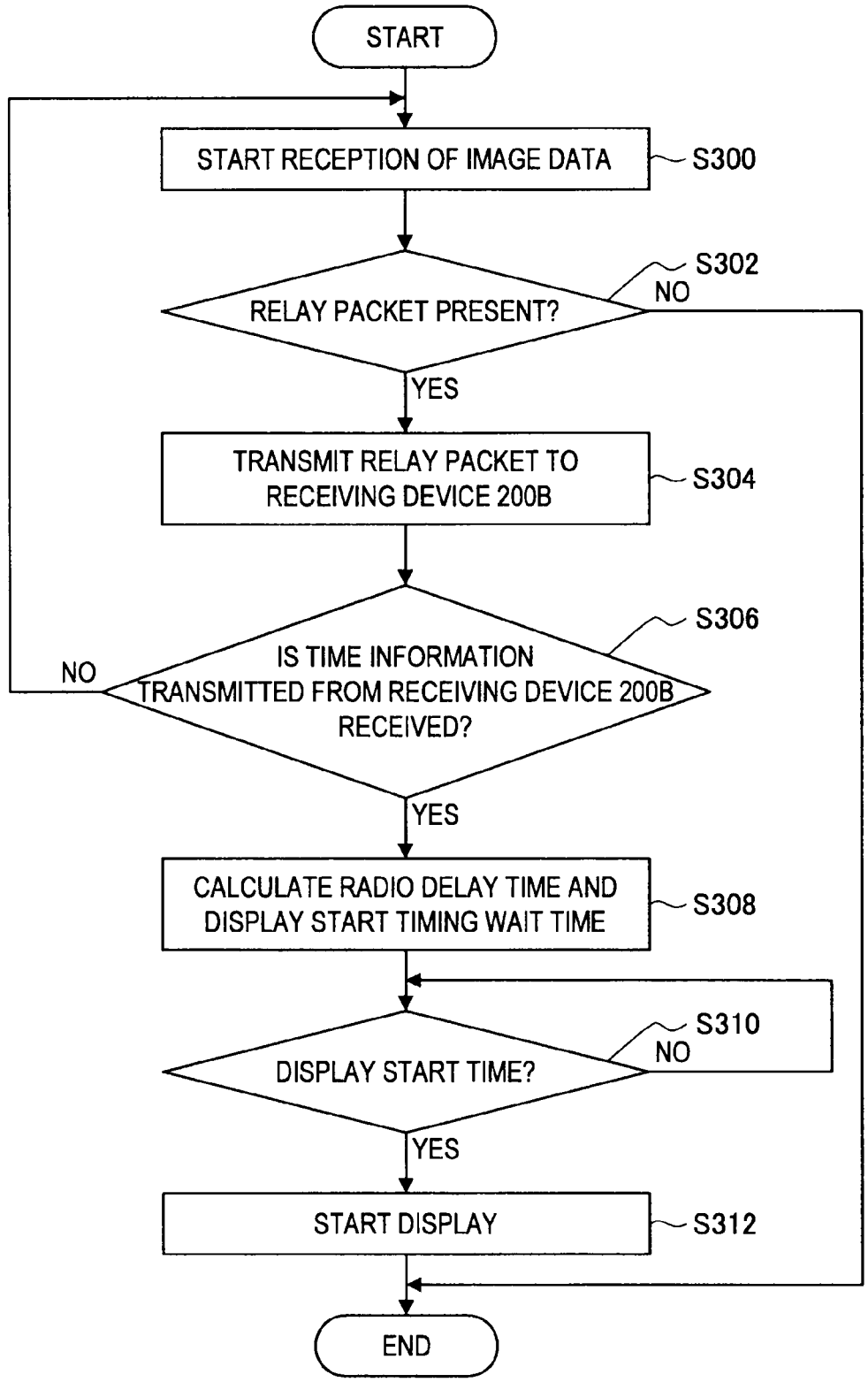
FIG. 11 is a flowchart showing an example of a process performed by a receiving device serving as a relay device in accordance with this embodiment.

Herein, the process performed by the receiving device 200 will be described more specifically. FIG. 11 is a flowchart showing an example of a process performed by the receiving device 200 serving as a relay device in accordance with this embodiment. Herein, FIG. 11 shows an example of a process performed when the receiving device 200A shown in FIG. 4 receives transmission data including the image data shown in FIG. 1, for example.

The receiving device 200A, upon starting reception of image data (S300), determines the presence or absence of a packet to be relayed (relay packet) (S302). Herein, the receiving device 200A, when the transmission target of the transmission data includes a device other than the receiving device 200A, determines the presence of a packet to be relayed. Alternatively, the receiving device 200A may, when a packet including time information is received from another receiving device 200 (e.g., the receiving device 200B), determines the presence of a packet to be relayed.

When a packet to be relayed is not determined to be present in step S302, the receiving device 200A terminates the process. Note that the process performed by the receiving device 200A in accordance with this embodiment is not limited to the aforementioned example. For example, the receiving device 200A may, when a packet to be relayed is not determined to be present in step S302, perform the process of from step S310.

When a packet to be relayed is determined to be present in step S302, the receiving device 200A transmits the packet to the target receiving device 200B (S306).

When the packet is transmitted to the receiving device 200B in step S304, the receiving device 200A determines if a packet including time information, transmitted from the receiving device 200B, is received (S306). If a packet including time information is not determined to be received in step S306, the receiving device 200A repeats the process of from step S300.

Meanwhile, if a packet including time information is determined to be received in step S306, the receiving device 200A calculates the radio delay time between the receiving device 200A and the receiving device 200B in accordance with Formula 2 above, for example, and calculates the display start timing wait time in accordance with Formula 1 above (S308).

When the process in step S308 is performed, the receiving device 200A determines if the current time matches the display start time (S310). If the current time is not determined to match the display start time in step S310, the receiving device 200A does not advance the process until when the current time is determined to match the display start time.

Meanwhile, if the current time is determined to match the display start time in step S310, the receiving device 200A starts displaying an image corresponding to the received image data (S312).

The receiving device 200 performs the process shown in FIG. 11, for example, as a process in accordance with the second example of the communication system 1000. Note that it is needless to mention that the process performed by the receiving device 200 in accordance with this embodiment is not limited to the process shown in FIG. 11.

The communication system 1000 can synchronize the display start timings of the receiving device 200A, the receiving device 200B, and the communication device 300 by performing the aforementioned process, for example, as the process in accordance with the second example of the communication system 1000.

Note that the process in accordance with the second example of the communication system 1000 in accordance with this embodiment is not limited to the aforementioned process. For example, each of the receiving device 200 and the communication device 300 that constitute the communication system 1000 may be configured to be able to select whether to perform the process shown in FIG. 7 (the process in accordance with the first example) or the process shown in FIG. 8 or FIG. 10 (the process in accordance with the second example).

More specifically, for example, each of the receiving device 200 and the communication device 300 stores delay control information having set therein information about whether or not to perform a process by taking into account the communication delay time between the transmitting device 100 and the receiving device 200 (e.g., the receiving device 200B) that is the transmission target of the transmission data. Herein, the communication delay time may be, for example, time corresponding to the display start timing wait time represented by Formula 1 or the radio delay time between the receiving device 200 (e.g., the receiving device 200A) serving as a relay device and the receiving device 200 (e.g., the receiving device 200B) that is the transmission target of the transmission data. Then, each of the receiving device 200 and the communication device 300 performs the process shown in FIG. 8 or FIG. 10 (the process in accordance with the second example), for example, when the delay control information indicates that a process should be performed by taking the communication delay time into account.

Herein, the delay control information is set by, for example, an operation unit (described below) of each device or through a user operation performed using an external operation device such as a remote controller. However, the method of setting the delay control information is not limited thereto. For example, the communication system 1000 in accordance with this embodiment may set the delay control information on the basis of a setting instruction transmitted from a management server (not shown) that manages each device.

In addition, referring to the time (Tx) of the receiving device 200A in FIG. 8, for example, although the transmission time of the initially relayed packet is set to zero, the process performed by the communication system 1000 in accordance with this embodiment is not limited thereto. For example, the time (Tx) of the receiving device 200A and the time (Rx) of the receiving device 200A may be controlled by the same time control information. In such a case, for example, the receiving device 200A starts control based on the time control information at the start timing of the time (Rx) of the receiving device 200A, and the time (Tx) of the receiving device 200A is the time indicated by the time control information. When the time (Tx) of the receiving device 200A and the time (Rx) of the receiving device 200A are controlled by the same time control information as described above, for example, it becomes possible to facilitate the management of time in the receiving device 200A even when the receiving device 200A has only a single time of the receiving device 200A for the transmitting system (Tx) and the receiving system (Rx).

[3] Third Example of Process Performed by Communication System 1000

When a process in accordance with the aforementioned second example is performed, the communication system 1000 can synchronize the display start timing (an example of the content output start timing) among the receiving device 200A, the receiving device 200B, and the communication device 300. However, the method of synchronizing the display start timing in the communication system 1000 in accordance with this embodiment is not limited thereto. For example, in the communication system 1000, the receiving device 200 serving as a relay device can synchronize the display start timing in the communication system 1000 by transmitting a beacon for synchronization. Thus, next, as a process in accordance with a third example of the communication system 1000, a process performed when the receiving device 200 serving as a relay device has a management function (AP (Access Point) function) by means of beacons will be described. Described hereinafter is an example in which the communication system 1000 has a configuration in accordance with the second embodiment shown in FIG. 4, and communication between the transmitting device 100 and the receiving device 200A, and communication between the receiving device 200A and the receiving device 200B are managed by the same SSID (Service Set IDentifier).

Figure 12:
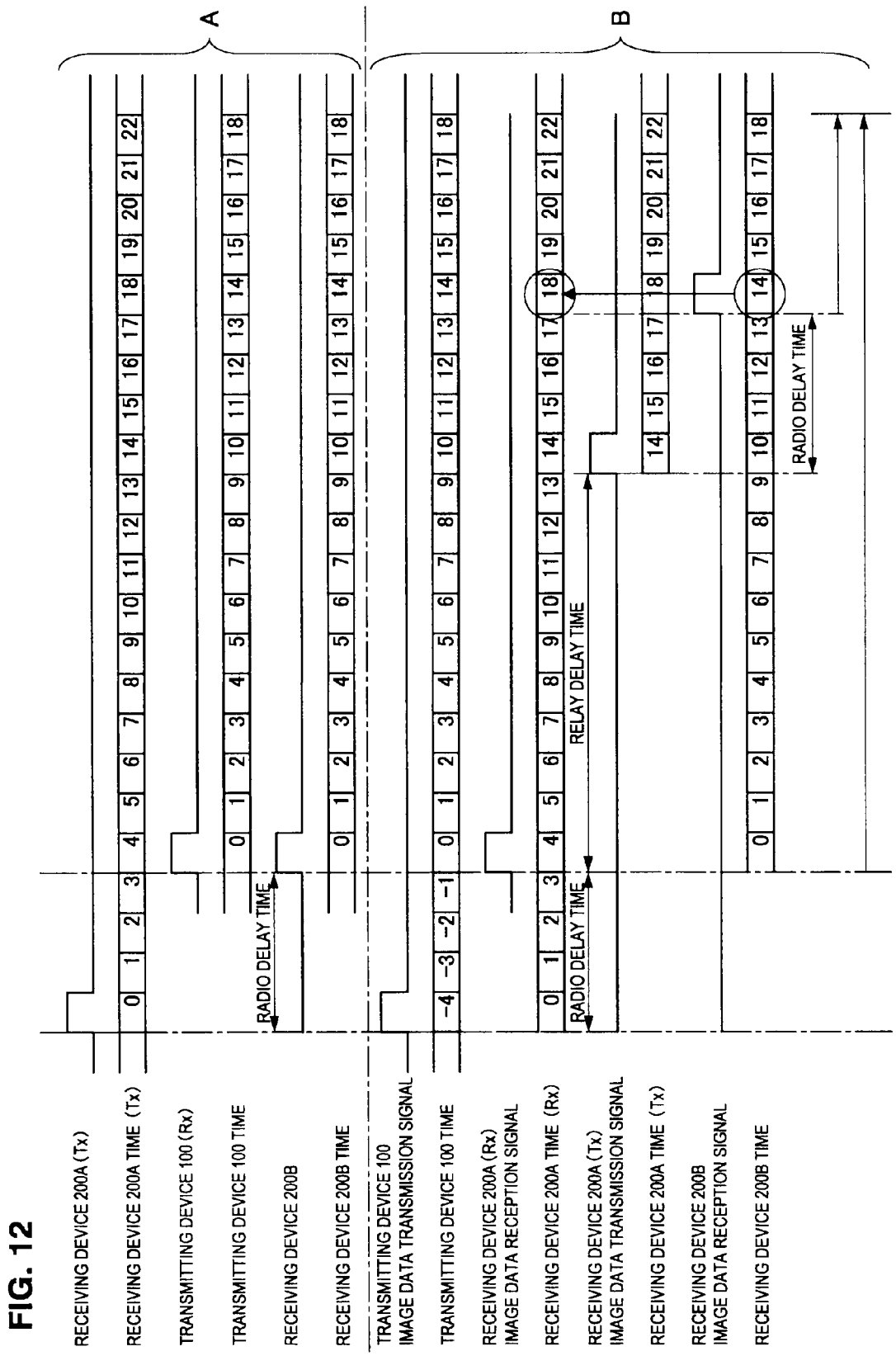
FIG. 12 is an explanatory diagram illustrating a third example of a process performed by the communication system in accordance with this embodiment.

FIG. 12 is an explanatory diagram illustrating a third example of a process performed by the communication system 1000 in accordance with this embodiment. Herein, symbol A in FIG. 12 shows an example of the operation performed by each device in the communication system 1000 immediately after the time synchronization is performed in the communication system 1000. Symbol B in FIG. 12 shows an example of the operation performed when image data is transmitted/received from the transmitting device 100 to the receiving device 200B using the time information acquired by the process shown by symbol A in FIG. 12.

Figure 13:
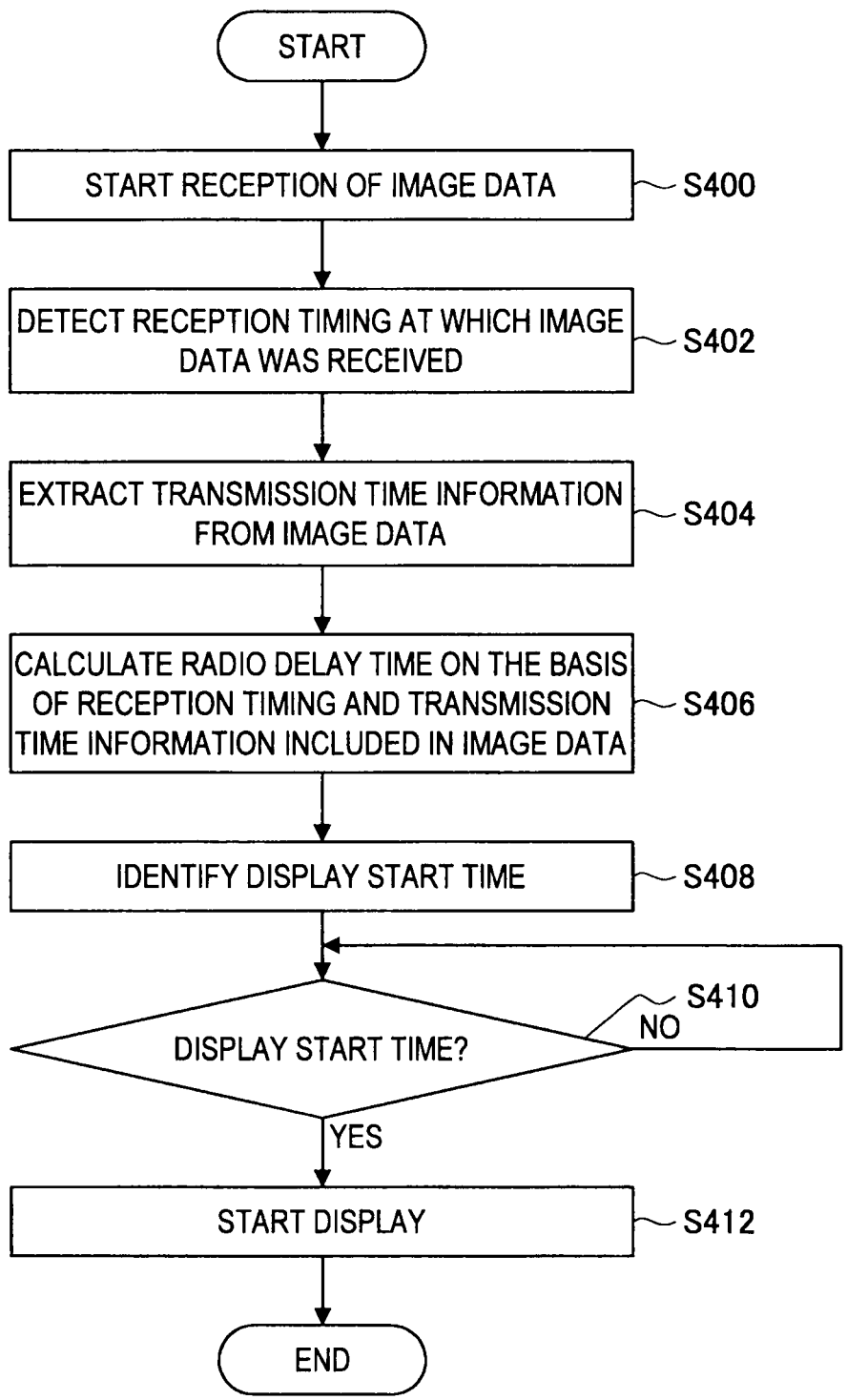
FIG. 13 is a flowchart showing an example of a process performed by a receiving device serving as a relay device in accordance with this embodiment.

Herein, the process performed by the receiving device 200 serving as a relay device will be described more specifically. FIG. 13 is a flowchart showing an example of a process performed by the receiving device 200A serving as a relay device in accordance with this embodiment. Hereinafter, an example will be described in which the transmitting device 100 inserts transmission time information, which indicates the transmission time, in the image data to be transmitted (an example of content data). Note that the transmission time information in accordance with this embodiment need not be transmitted while being inserted in the content data. For example, in the communication system 1000, the transmitting device 100 may transmit the transmission time information in synchronization with the content data. In such a case, the transmission time information serves as the synchronization information.

The receiving device 200A, upon receiving image data after transmitting the time information indicating the reference time of the receiving device 200A (e.g., information indicating the time zero in the receiving device 200A) as a beacon (S400), grasps the reception timing at which the image data was received on the basis of the reception time at the receiving device 200A (S402).

After the process in step S402, the receiving device 200A extracts the transmission time information inserted in the received image data (S404). Then, the receiving device 200A calculates the radio delay time on the basis of the time corresponding to the reception timing grasped in step S402 and the transmission time indicated by the transmission time information extracted in step S404. (S406).

Figure 14:
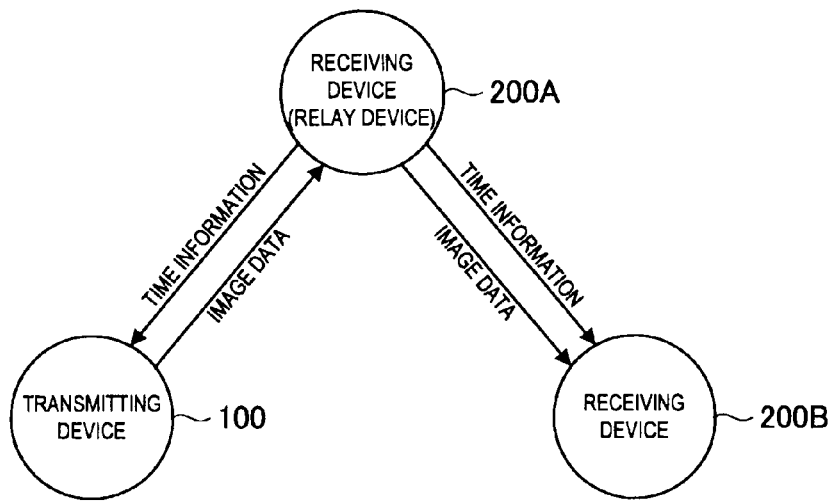
FIG. 14 is an explanatory diagram illustrating a third example of a process performed by the communication system in accordance with this embodiment.

FIG. 14 is an explanatory diagram illustrating a third example of a process performed by the communication system 1000 in accordance with this embodiment, and shows part of the network topology of the communication system 1000. The transmitting device 100, the receiving device 200A, and the receiving device 200B that constitute the communication system 1000 form the network topology shown in FIG. 14. Thus, the receiving device 200A can calculate the radio delay time by performing the computation represented by Formula 2 above, for example.

Referring again to FIG. 13, an example of a process performed by the receiving device 200A serving as a relay device will be described. When the radio delay time is calculated in step S406, the receiving device 200A calculates the display start timing wait time in accordance with Formula 1 above, for example, and identifies the display start time (S408).

After the process in step S408, the receiving device 200A determines if the current time matches the display start time (S410). If the current time is not determined to match the display start time in step S410, the receiving device 200A does not advance the process until when the current time is determined to match the display start time.

Meanwhile, if the current time is determined to match the display start time in step S410, the receiving device 200A starts displaying an image corresponding to the received image data (S412).

The receiving device 200 performs the process shown in FIG. 13, for example, as a process in accordance with the third example of the communication system 1000. Note that it is needless to mention that the process performed by the receiving device 200 in accordance with this embodiment is not limited to the process shown in FIG. 13.

The communication system 1000 can, by performing the aforementioned process as a process in accordance with the third ample of the communication system 1000, for example, synchronize the display start timing among the receiving device 200A, the receiving device 200B, and the communication device 300 without transferring packets of time information, for example.

Note that the process in accordance with the third example of the communication system 1000 in accordance with this embodiment is not limited to the aforementioned example. For example, although an example in which the receiving device 200 serving as a relay device is a device having a beacon transmission function (i.e., a device having an AP function) is described device, the receiving device 200 serving as a relay device need not have the beacon transmission function. In such a case, for example, an operation similar to that when the receiving device 200 has the beacon transmission function can be realized if the receiving device 200 serving as a relay device has a function of transmitting Multicast packets or Multiple-Unicast packets, and time information indicating the reference time of the receiving device 200 (e.g., information indicating the time zero in the receiving device 200) is transmitted while being inserted in such packets.

(Transmitting Device, Receiving Device, and Communication Device in Accordance with this Embodiment)

Next, an exemplary configuration of each of the transmitting device 100, the receiving device 200, and the communication device 300 that constitute the aforementioned communication system 1000 in accordance with this embodiment will be described.

[1] Transmitting Device 100

Figure 15:
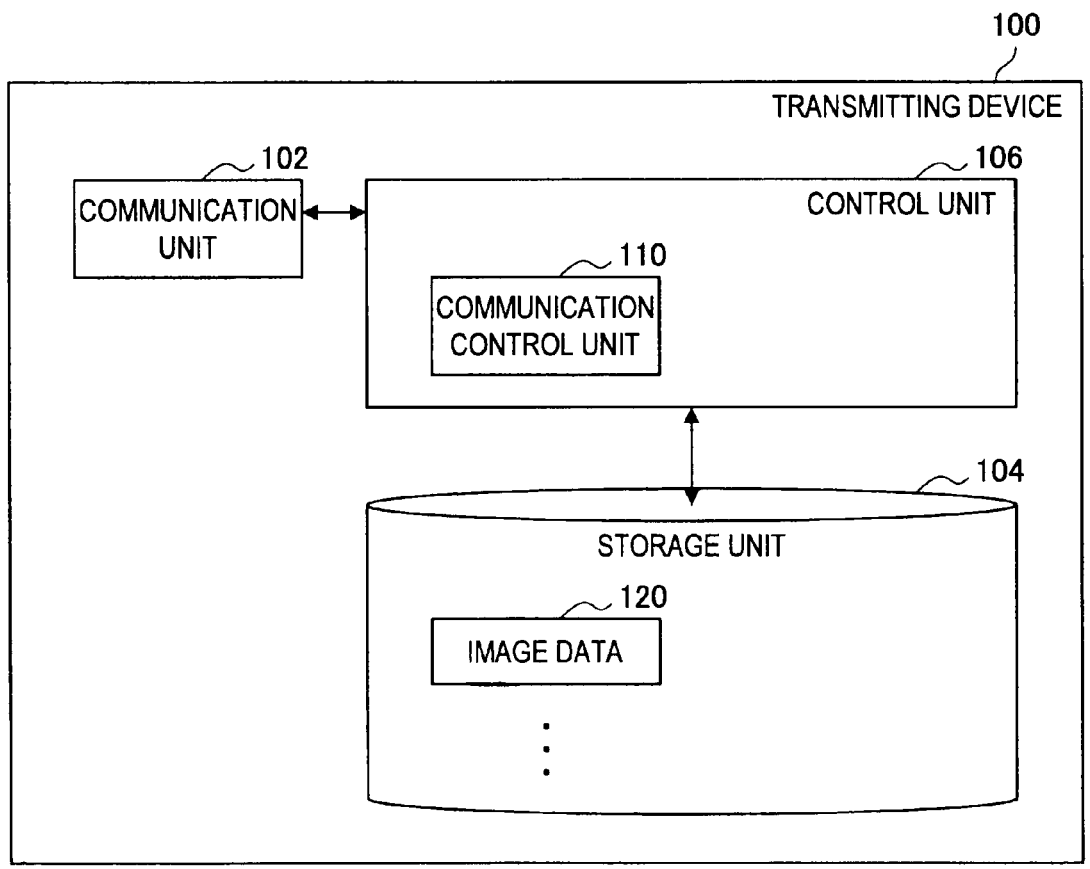
FIG. 15 is a block diagram showing an exemplary configuration of a transmitting device in accordance with this embodiment.

FIG. 15 is a block diagram showing an exemplary configuration of the transmitting device 100 in accordance with this embodiment. The transmitting device 100 includes, for example, a communication unit 102, a storage unit 104, and a control unit 106.

The transmitting device 100 may also include ROM (Read Only Memory, not shown), RAM (not shown), an operation unit (not shown) operable by a user, a display unit (not shown) that displays various screens on a display screen, and the like, for example. The transmitting device 100 connects the aforementioned components with a bus as a data transmission channel, for example.

The ROM (not shown) stores control data such as programs and operation parameters used by the control unit 106. The RAM (not shown) temporarily stores programs and the like executed by the control unit 106. The operation unit (not shown) may be, for example, an operation device described below, for example, and the display unit (not shown) may be a display device described below, for example.

[Exemplary Hardware Configuration of Transmitting Device 100]

Figure 16:
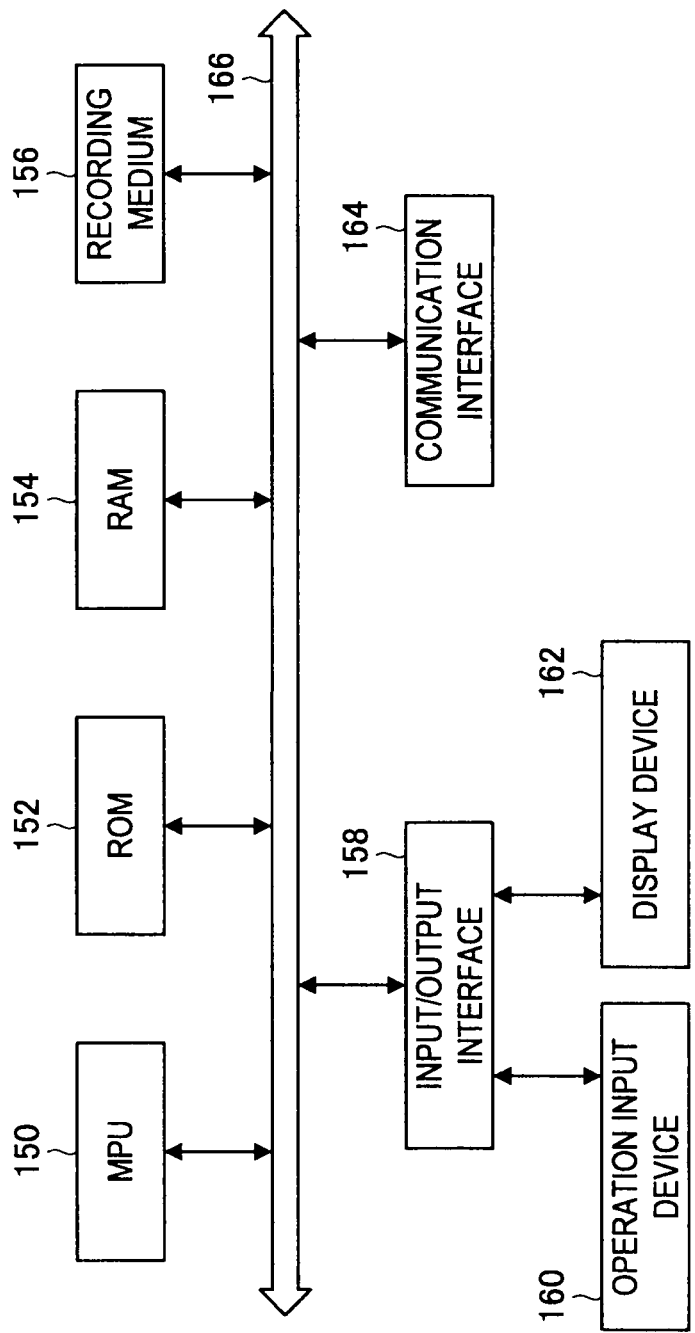
FIG. 16 is an explanatory diagram showing an exemplary hardware configuration of a transmitting device in accordance with this embodiment.

FIG. 16 is an explanatory diagram showing an exemplary hardware configuration of the transmitting device 100 in accordance with this embodiment. The transmitting device 100 includes, for example, a MPU 150, ROM 152, RAM 154, a recording medium 156, an input/output interface 158, an operation input device 160, a display device 162, and a communication interface 164. In addition, the transmitting device 100 connects the aforementioned components with a bus 166 as a data transmission channel, for example.

The MPU 150 includes a MPU (Micro Processing Unit), an integrated circuit constructed by integrating various circuits for implementing the control function, and the like, and functions as the control unit 106 that controls the entire transmitting device 100. The MPU 150 can also serve as a communication control unit 110 described below in the transmitting device 100.

The ROM 152 stores control data such as programs and operation programs used by the MPU 150, for example. The RAM 154 temporarily stores programs executed by the MPU 150, for example.

The recording medium 156 is a storage means of the transmitting device 100, and functions as the storage unit 104. The recording medium 156 stores, for example, content data such as image data, an application, and the like. The recording medium 156 may be, for example, a magnetic recording medium such as a hard disk or nonvolatile memory such as flash memory, MRAM (Magnetoresistive Random Access Memory), or FeRAM (Ferroelectric Random Access Memory). In addition, the recording medium 156 may be removable from the transmitting device 100.

The input/output interface 158, for example, connects the operation input device 160 and the display device 162. The operation input device 160 functions as an operation unit (not shown), and the display device 162 functions as a display unit (not shown). Herein, the input/output interface 160 may be, for example, a USB (Universal Serial Bus) terminal, a DVI (Digital Visual Interface) terminal, a HDMI (High-Definition Multimedia Interface) terminal, various processing circuits, or the like. In addition, the operation input device 160 is provided on the transmitting device 100, for example, and is connected to the input/output interface 158 within the transmitting device 100. The operation input device 160 may be, for example, a button, a direction key, a rotary selector such as a jog dial, or a combination of them. The display device 162 is provided on the transmitting device 100, for example, and is connected to the input/output interface 158 within the transmitting device 100. The display device 162 may be, for example, a liquid crystal display (LCD) or an organic EL display (an organic ElectroLuminescence display, or also referred to as an OLED display (Organic Light Emitting Diode display)). It is needless to mention that the input/output interface 158 can also connect to an operation input device (e.g., a keyboard or a mouse) or a display device (e.g., an external display) as an external device of the transmitting device 100. In addition, the display device 162 may be a device that can display information and be operated by a user, such as a touch screen, for example.

The communication interface 164 is a communication means of the transmitting device 100 and functions as the communication unit 102 for wirelessly communicating with an external device via a network (or directly). Herein, the communication interface 164 may be, for example, an IEEE 802.11n port and a transmitting/receiving circuit, or a communication antenna and an RF (Radio Frequency) circuit. Note that the communication interface 164 in accordance with this embodiment is not limited thereto. For example, the communication interface 164 may be a device supporting a given communication method and capable of constructing a wireless communication network such as the one shown in FIG. 2 or FIG. 4, for example.

The transmitting device 100, with the configuration shown in FIG. 16, for example, communicates with the receiving device 200 and transmits transmission data.

Note that the configuration of the transmitting device 100 in accordance with this embodiment is not limited to that shown in FIG. 16. For example, the transmitting device 100 may further include another communication means for performing wire communication with an external device via a network (or directly). Another communication means of the transmitting device 100 may be, for example, a LAN (Local Area Network) terminal, a transmitting/receiving circuit, or the like.

Referring again to FIG. 15, an exemplary configuration of the transmitting device 100 will be descried. The communication unit 102 is a communication means of the transmitting device 100, and serves the function of wirelessly communicating with an external device via a network (or directly). Herein, the communication unit 102 may be, for example, an IEEE 802.11n port and a transmitting/receiving circuit, or a communication antenna and an RF (Radio Frequency) circuit.

The storage unit 104 is a storage means of the transmitting device 100. Herein, the storage unit 104 may be, for example, a magnetic recording medium such as a hard disk or nonvolatile memory such as flash memory.

The storage unit 104 stores content data such as image data, an application, and the like. In FIG. 15, an example in which image data 120 . . . is stored in the storage unit 104 is shown.

The control unit 106 may include a MPU, for example, and serves the function of controlling the entire transmitting device 100. The control unit 106 also includes a communication control unit 110, for example.

The communication control unit 110 controls communication with an external device via the communication unit 102. More specifically, the communication control unit 110 transmits transmission data as shown in FIG. 3 by playing a leading role in performing the process shown in FIG. 5, for example. Herein, the communication control unit 110, when transmitting image data, transmits image data stored in the storage unit 104, for example. Note that the communication control unit 110 may receive image data transmitted from an external device such as image data generated through an imaging process by an external imaging device, for example, and transmit the received image data to the target receiving device 200.

The transmitting device 100, with the configuration shown in FIG. 15, for example, communicates with an external device, and transmits transmission data to a specific device. Note that the configuration of the transmitting device 100 in accordance with this embodiment is not limited to that shown in FIG. 15. For example, the transmitting device 100 may further include a processing unit that that performs various processing such as encoding of content data.

Although the transmitting device 100 is described above as an example of the components of the communication system 1000 in accordance with this embodiment, this embodiment is not limited thereto. This embodiment can be applied to various devices having a communication function, for example, a computer such as a PC (Personal Computer) or a server, a portable communication device such as a portable phone or a PHS (Personal Handyphone System), a video/music reproducing device, a video/music recording/reproducing device, a game machine, or an imaging device.

[2] Receiving Device 200

Figure 17:
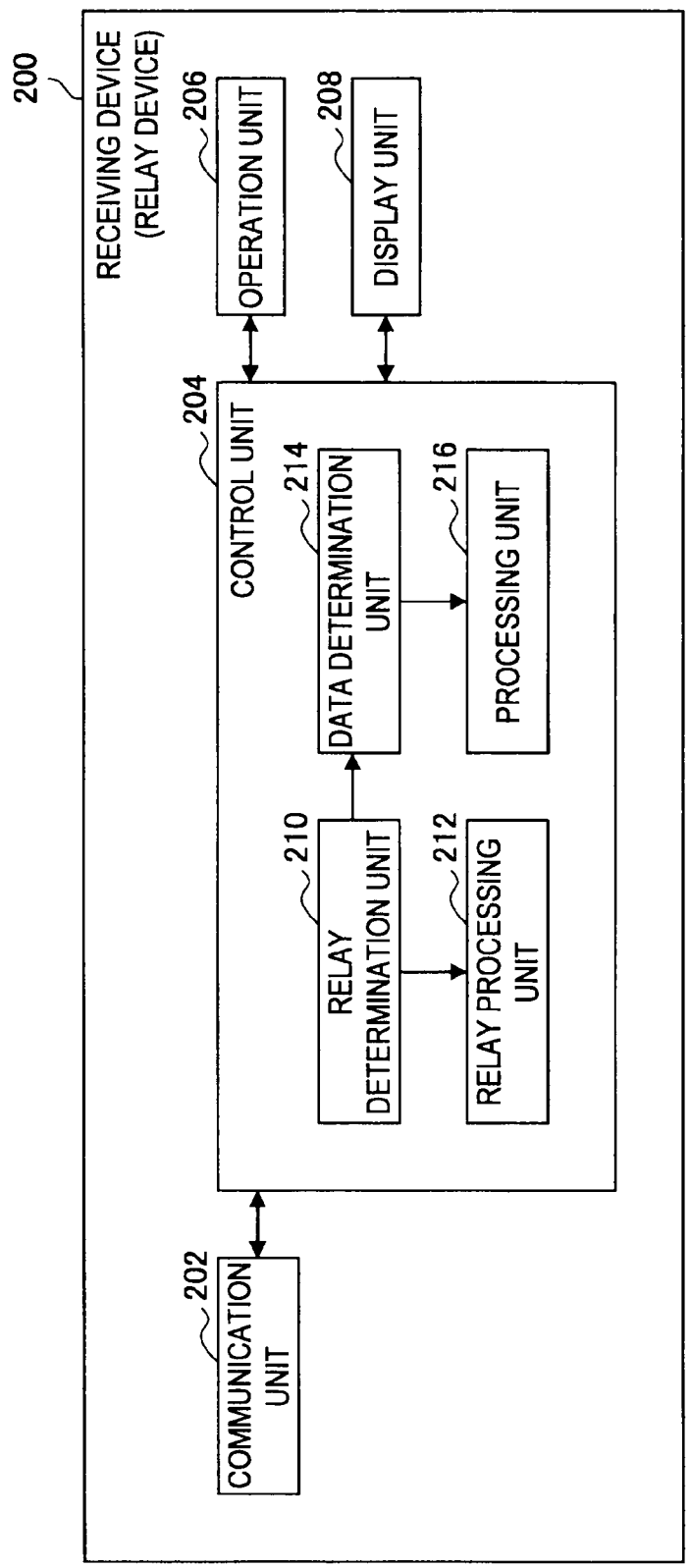
FIG. 17 is a block diagram showing an exemplary configuration of a receiving device in accordance with this embodiment.

Next, an exemplary configuration of the receiving device 200 in accordance with this embodiment will be described. FIG. 17 is a block diagram showing an exemplary configuration of the receiving device 200 in accordance with this embodiment. Herein, FIG. 17 shows an exemplary configuration of the receiving device 200 that can serve as a relay device.

The receiving device 200 includes, for example, a communication unit 202, a control unit 204, an operation unit 206, and a display unit 208.

The receiving device 200 may also include, for example, ROM (not shown), RAM (not shown), or a storage unit (not shown). The receiving device 200 connects the aforementioned components with a bus as a data transmission channel, for example.

The ROM (not shown) stores control data such as programs and operation parameters used by the control unit 204. The RAM (not shown) temporarily stores programs and the like executed by the control unit 204.

The storage unit (not shown) is a storage means of the receiving device 200. Herein, the storage unit (not shown) may be, for example, a magnetic recording medium such as a hard disk or nonvolatile memory such as flash memory.

[Exemplary Hardware Configuration of Receiving Device 200]

The receiving device 200 has a hardware configuration similar to that of the transmitting device 100 shown in FIG. 16, for example. Herein, the MPU 150 shown in FIG. 16 functions as the control unit 204. The MPU 150 can also serve as, in the receiving device 200, a relay determination unit 210, a relay processing unit 212, a data determination unit 214, and a processing unit 216 described below. The operation input device 160 shown in FIG. 16 functions as the operation unit 206, and the display device 162 shown in FIG. 16 functions as the display unit 208. In addition, the communication interface 164 shown in FIG. 16 functions as the communication unit 202.

Note that the hardware configuration of the receiving device 200 is not limited to the configuration shown in FIG. 16. For example, the receiving device 200 may further include, in addition to the communication means 164, one or more (an)other communication means. Herein, (an)other communication means of the receiving device 200 may be a communication means that performs wire communication with an external device via a network (or directly) or a communication means that performs wireless communication with an external device via a network (or directly). The communication means that performs wire communication with an external device may be, for example, a LAN terminal and a transmitting/receiving circuit. The communication means that performs wireless communication with an external device may be, for example, a communication device of the same type as or a different type from the communication interface 164.

The communication unit 202 is a communication means of the receiving device 200, and serves the function of performing wireless communication with an external device such as the transmitting device 100 via a network (or directly). Herein, the communication unit 202 may have, for example, a configuration corresponding to the communication unit 102 of the transmitting device 100 shown in FIG. 15.

The communication unit 202 serves the function of performing some of the processes in accordance with the communication method in accordance with this embodiment of the receiving device 200 (the aforementioned process (i) (a process of receiving transmission data transmitted by unicast from the transmitting device 100) to the process (v) (a process of processing the data determined to be used for the process). More specifically, the communication unit 202 serves the function of performing the aforementioned process (i) (a process of receiving transmission data transmitted by unicast from the transmitting device 100).

The control unit 204 includes a MPU or the like, for example, and serves the function of controlling the entire receiving device 200. In addition, the control unit 204 includes, for example, the relay determination unit 210, the relay processing unit 212, the data determination unit 214, and the processing unit 216, and serves the function of playing a leading role in performing a process in accordance with the communication method in accordance with this embodiment of the receiving device 200.

The relay determination unit 210 plays a leading role in performing the aforementioned process (ii) (a process of determining the transmission target of the received transmission data). More specifically, the relay determination unit 210 determines the transmission target of the transmission data received by the communication unit 202.

Herein, the relay determination unit 210, when an IP address set in the header of the transmission data includes an IP address corresponding to the receiving device 200, for example, determines that the transmission target of the transmission data includes the receiving device 200. In such a case, the relay determination unit 210 transmits to the data determination unit 214 a signal indicating that the transmission target of the transmission data includes the receiving device 200. In addition, the relay determination unit 210 may further transmits to the processing unit 216 the signal indicating that the transmission target of the transmission data includes the receiving device 200.

Meanwhile, the relay determination unit 210, when an IP address set in the header of the transmission data includes an IP address other than the IP address corresponding to the receiving device 200, determines the presence of the other transmission target device of the transmission data. In such a case, the relay determination unit 210, for example, transmits to the relay processing unit 212 a signal indicating the presence of the other transmission target device. Note that in such a case, the content of the signal transmitted from the relay determination unit 210 to the relay processing unit 212 is not limited to that described above. For example, the relay determination unit 210 may further transmit the IP address other than the IP address corresponding to the receiving device 200 to the relay processing unit 212. In addition, the relay determination unit 210 may further transmit to the processing unit 216 the signal indicating the presence of the other transmission target device.

The relay processing unit 212 plays a leading role in performing the aforementioned process (iii) (a relay process of re-transmitting the transmission data to the transmission target device). More specifically, the relay processing unit 212, when a signal indicating the presence of the other transmission target device is transmitted from the relay determination unit 210, transmits the transmission data to the transmission target device via the communication unit 202.

The data determination unit 214 plays a leading role in performing the process (iv) (a process of selectively determining the data to be used for a process from among the received transmission data). More specifically, the data determination unit 214, when a signal indicating that the transmission target of the transmission data includes the receiving device 200 is transmitted from the relay determination unit 210, determines the data to be used for a process from among the transmission data received by the communication unit 202. Herein, the data determined by the data determination unit 214 may be various data such as, for example, content data, text data, update data, or control data.

The data determination unit 214 determines the data to be used for a process on the basis of the identification information (e.g., an identifier included in the image header shown by symbol D in FIG. 1) detected from the received transmission data, and the information to be processed stored in the storage unit (not shown), for example. Note that the data determination process of the data determination unit 214 is not limited to such example.

The data determination unit 214, upon determining the data to be used for a process, transmits to the processing unit 216 a signal indicating the presence of the data to be used for a process. Note that in such a case, the content of the signal transmitted from the data determination unit 214 to the processing unit 216 is not limited to that described above. For example, the data determination unit 214 may further transmit a signal indicating the type of the determined data to the processing unit 216.

The processing unit 216 plays a leading role in performing the aforementioned process (v) (a process of processing the data determined to be used for the process). More specifically, the processing unit 216, when a signal indicating the presence of the data to be used for a process is transmitted from the data determination unit 214, processes the transmission data received by the communication unit 202. Herein, the process performed by the processing unit 216 may be, for example, a process of reproducing content data, a process of displaying an image in accordance with image data (an example of the content data) on a display screen, or a process of causing an audio output device to output audio in accordance with audio data (an example of the content data).

Further, the processing unit 216 can, when the relay determination unit 210 determines that the transmission target of the transmission data includes a device other than the receiving device 200, and also determines the transmission target of the transmission data includes the receiving device 200, process the determined data after a predetermined time has elapsed. Herein, the predetermined time may be, for example, time obtained by adding up the relay delay time, which is required for the relay processing unit 212 to transmit the transmission data to the transmission target device, and the radio delay time (communication delay time) between the receiving device 200 and the transmission target device. Note that the predetermined time in accordance with this embodiment is not limited to such example. For example, the predetermined time in accordance with this embodiment may be one of the relay delay time or the radio delay time.

Herein, the processing unit 216 can identify the relay delay time by, for example, monitoring the process of the relay determination unit 210 or when the relay delay time is transmitted from the relay determination unit 210.

In addition, the processing unit 216 can identify the radio delay time by using information on the radio delay time measured in advance.

Note that the method of identifying the radio delay time with the processing unit 216 is not limited to the aforementioned example. For example, the processing unit 216 may transmit to the transmitting device 100 time information indicating the time of the receiving device 200 via the communication unit 202, and calculate the radio delay time on the basis of transmission data transmitted from the transmitting device 100 whose time is adjusted on the basis of the time information and received by the communication unit 202. More specifically, the processing unit 216 calculates the radio delay time by performing the computation of Formula 2 above, for example. Note that the radio delay time used as the predetermined time by the processing unit 216 is not limited to the radio delay time between the transmitting device 100 and the receiving device 200. For example, the processing unit 216 can calculate the radio delay time between the receiving device 200 and the transmission target device of the transmission data by performing the computation of Formula 2 above, and use as the predetermined time the calculated radio delay time between the receiving device 200 and the transmission target device of the transmission data.

When the processing unit 216 processes the determined data after a predetermined time has elapsed as described above, for example, it becomes possible to achieve synchronization between each device that constitutes the communication system 1000.

In addition, the processing unit 216 can also switch whether or not to process the determined data after a predetermined time has elapsed, on the basis of the delay control information stored in the storage unit (not shown), for example.

The control unit 204, by having the relay determination unit 210, the relay processing unit 212, the data determination unit 214, and the processing unit 216, for example, plays a leading role in performing a process in accordance with the communication method in accordance with this embodiment of the receiving device 200. Note that it is needless to mention that the configuration for implementing the process in accordance with the communication method in accordance with this embodiment of the receiving device 200 is not limited to the configuration shown in FIG. 17.

The operation unit 206 is an operation means of the receiving device 200 that can be operated by a user. The receiving device 200 can be operated by a user by having the operation unit 206, and can perform, in response to a user operation, a process desired by the user. Herein, the operation unit 206 may be, for example, a button, a direction key, a rotary selector such as a jog dial, or a combination of them.

The display unit 208 is a display means of the receiving device 200, and displays various information on the display screen. The screen displayed on the display screen of the receiving device 200 may be, for example, a content reproducing screen in accordance with reproduction of content data or an operation screen for causing the receiving device 200 to perform a desired operation. Herein, the display unit 208 may be, for example, a liquid crystal display or an organic EL display. Alternatively, the display unit 208 of the receiving device 200 can be constructed using a touch screen, for example. In such a case, the display unit 208 functions as an operation display unit that can be operated by a user and can display information.

The receiving device 200, with the configuration shown in FIG. 17, for example, performs a process in accordance with the communication method in accordance with this embodiment of the receiving device 200. Note that the configuration of the receiving device 200 in accordance with this embodiment is not limited to the configuration shown in FIG. 17. For example, the receiving device 200 in accordance with this embodiment need not include the operation unit 206 and the display unit 208.

Although the receiving device 200 is described above as an example of the components of the communication system 1000 in accordance with this embodiment, this embodiment is not limited thereto. This embodiment can be applied to various devices having a communication function, for example, a computer such as a PC or a server, a portable communication device such as a portable phone or a PHS, a video/music reproducing device, a video/music recording/reproducing device, a game machine, or an imaging device.

[3] Communication Device 300

Figure 18:
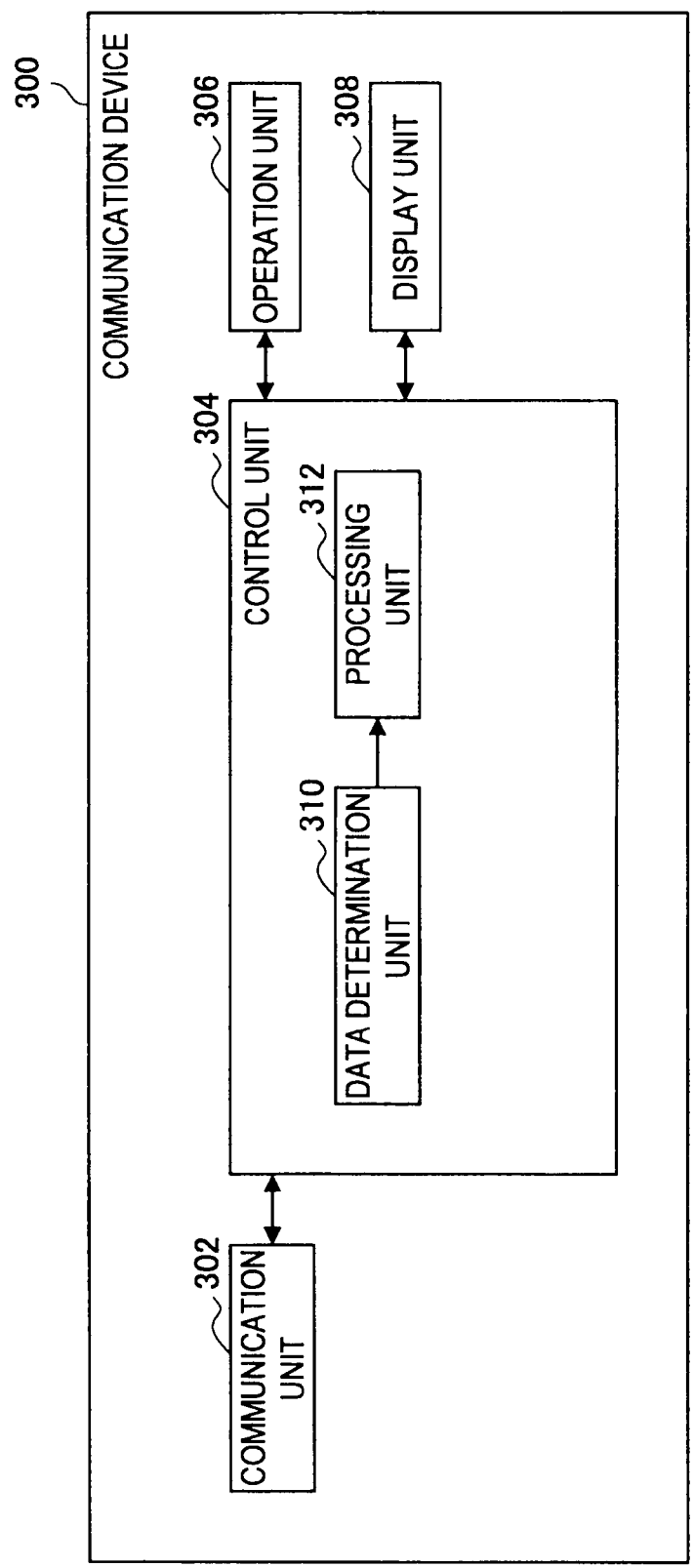
FIG. 18 is a block diagram showing an exemplary configuration of a communication device in accordance with this embodiment.

An exemplary configuration of the communication device 300 in accordance with this embodiment will be described. FIG. 18 is a block diagram showing an exemplary configuration of the communication device 300 in accordance with this embodiment.

The communication device 300 includes, for example, a communication unit 302, a control unit 304, an operation unit 306, and a display unit 308.

The communication device 300 may also include, for example, ROM (not shown), RAM (not shown), or a storage unit (not shown). The communication device 300 connects the aforementioned components with a bus as a data transmission channel, for example.

The ROM (not shown) stores control data such as programs and operation parameters used by the control unit 304. The RAM (not shown) temporarily stores programs executed by the control unit 304.

The storage unit (not shown) is a storage means of the communication device 300. Herein, the storage unit (not shown) may be, for example, a magnetic recording medium such as a hard disk or nonvolatile memory such as flash memory.

[Exemplary Hardware Configuration of Communication Device 300]

The communication device 300 has a hardware configuration similar to that of the transmitting device 100 shown in FIG. 16, for example. Herein, the MPU 150 shown in FIG. 16 functions as the control unit 304. The MPU 150 can also serve as, in the communication device 300, a data determination unit 310 and a processing unit 312 described below. The operation input device 160 shown in FIG. 16 functions as the operation unit 306, and the display device 162 shown in FIG. 16 functions as the display unit 308. The communication interface 164 shown in FIG. 16 functions as the communication unit 302.

Note that the hardware configuration of the communication device 300 is not limited to the configuration shown in FIG. 16. For example, the communication device 300 may further include, in addition to the communication interface 164, one or more (an)other communication means as in the receiving device 200.

The communication unit 302 is a communication means of the communication device 300, and serves the function of wirelessly communicating with an external device such as the transmitting device 100 or the receiving device 20 via a network (or directly). Herein, the communication unit 302 may have, for example, a configuration corresponding to the communication unit 102 of the transmitting device 100 shown in FIG. 15 or a configuration corresponding to the communication unit 202 of the receiving device 200 shown in FIG. 17.

The communication unit 302 serves the function of performing some of the processes in accordance with the communication method in accordance with this embodiment of the communication device 300 (the aforementioned process (1) (a process of receiving communication data) to the process (3) (a process of processing the data determined to be used for the process)). More specifically, the communication unit 302 serves the function of performing the aforementioned process (1) (a process of receiving communication data).

The control unit 304 includes, for example, a MPU and the like, and serves the function of controlling the entire communication device 300. In addition, the control unit 304, for example, includes the data determination unit 310 and the processing unit 312, and plays a leading role in performing a process in accordance with the communication method in accordance with this embodiment of the communication device 300.

The data determination unit 310 plays a leading role in performing the process (2) (a process of determining the data to be used for a process from among the received communication data). More specifically, the data determination unit 310 determines the data to be used for a process from among the communication data received by the communication unit 302. Herein, the data determined by the data determination unit 310 may be various data such as, for example, content data, text data, update date, or control data. Meanwhile, the data determination unit 310, for example, does not determine response data such as ACK or NACK as the data to be used for a process (data to be processed). Note that the data determination unit 310 may determine whether or not the transmission data should be re-transmitted on the basis of response data such as ACK or NACK received by the communication unit 302.

The data determination unit 310 determines the data to be used for a process on the basis of identification information detected from the received communication data (e.g., an identifier included in the image header shown by symbol D in FIG. 1 or an identifier included in each header shown by symbols A to C in FIG. 1), and the information to be processed stored in the storage unit (not shown). Note that the data determination process of the data determination unit 310 is not limited to such example. For example, the data determination unit 310 may, when communication data includes device specifying information indicating a specific device or a specific device group, selectively determine the data to be used for a process on the basis of the device specifying information.

In addition, the data determination unit 310, upon determining the data to be used for a process, transmits to the processing unit 312 a signal indicating the presence of the data to be used for a process. Note that in such a case, the content of the signal transmitted from the data determination unit 310 to the processing unit 312 is not limited to that described above. For example, the data determination unit 310 may further transmit to the processing unit 312 a signal indicating the type of the determined data.

In addition, the data determination unit 310, in accordance with the data determination result, discards the communication data (or part of the communication data) received by the communication unit 302 or causes another unit such as the communication unit 302 to discard the communication data (or part of the communication data), for example.

The processing unit 312 plays a leading role in performing the aforementioned process (3) (a process of processing the data determined to be used for the process). More specifically, the processing unit 312, when a signal indicating the presence of the data to be used for a process is transmitted from the data determination unit 130, for example, processes the communication data received by the communication unit 302. Herein, the process performed by the processing unit 312 may be, for example, a process of reproducing content data, a process of displaying an image in accordance with image data (an example of the content data) on a display screen, or a process of causing an audio output device to output audio in accordance with audio data (an example of the content data).

Further, the processing unit 312, when processing the determined data, prevents the communication unit 302 from responding to the source device that has transmitted the communication data received by the communication unit 302. Herein, the communication data received by the communication unit 302 may be, for example, data (or a signal) transmitted/received between the transmitting device 100 and the receiving device 200 or data (or a signal) transmitted/received between one receiving device 200 and the other receiving device 200.

Furthermore, the processing unit 312 may process the determined data after a predetermined time has elapsed. Herein, the predetermined time may be, for example, the radio delay time (communication delay time) between the communication device 300 and the transmitting device 100 or the receiving device 200 serving as a relay device.

The processing unit 312, for example, transmits time information indicating the time of the communication device 300 to the transmitting device 100 via the communication unit 304, and calculates the radio delay time between the communication device 300 and the transmitting device 100 on the basis of transmission data transmitted from the transmitting device 100 whose time is adjusted on the basis of the time information and received by the communication unit 302. In addition, the processing unit 312 can calculate the radio delay time between the communication device 300 and the receiving device 200 by transmitting time information to the receiving device 200 serving as a relay device. More specifically, the processing unit 312, for example, calculates the radio delay time by performing the computation of Formula 2 above.

Note that the predetermined time used for the process of the processing unit 312 is not limited to the aforementioned example. For example, the processing unit 312 may, when the communication unit 302 receives communication delay time information transmitted from an external device such as the receiving device 200 serving as a relay device, use the delay time indicated by the communication delay time information as the predetermined time.

When the processing unit 312 processes the determined data after a predetermined time has elapsed as described above, for example, it becomes possible to achieve synchronization between each device that constitutes the communication system 1000.

In addition, the processing unit 312 can also switch whether or not to process the determined data after a predetermined time has elapsed, on the basis of the delay control information stored in the storage unit (not shown).

The control unit 304, by having the data determination unit 310 and the processing unit 312, for example, plays a leading role in performing a process in accordance with the communication method in accordance with this embodiment of the communication device 300. Note that it is needless to mention that the configuration for implementing the process in accordance with the communication method in accordance with this embodiment of the communication device 300 is not limited to the configuration shown in FIG. 18.

The operation unit 306 is an operation means of the communication device 300 that can be operated by a user. The communication device 300 can be operated by a user by having the operation unit 306, and can perform, in response to a user operation, a process desired by the user. Herein, the operation unit 306 may be, for example, a button, a direction key, a rotary selector such as a jog dial, or a combination of them.

The display unit 308 is a display means of the communication device 300, and displays various information on the display screen. The screen displayed on the display screen of the communication device 300 may be, for example, a content reproducing screen in accordance with reproduction of content data or an operation screen for causing the communication device 300 to perform a desired operation. Herein, the display unit 308 may be, for example, a liquid crystal display or an organic EL display. Alternatively, the display unit 308 of the communication device 300 can be constructed using a touch screen, for example. In such as case, the display unit 308 functions as an operation display unit that can be operated by a user and can display information.

The communication device 300, with the configuration shown in FIG. 18, for example, performs a process in accordance with the communication method in accordance with this embodiment of the communication device 300. Note that the configuration of the communication device 300 in accordance with this embodiment is not limited to the configuration shown in FIG. 18. For example, the communication device 300 in accordance with this embodiment 300 need not include the operation unit 306 and the display unit 308.

Although the communication device 300 is described above as an example of the components of the communication system 1000 in accordance with this embodiment, this embodiment is not limited thereto. This embodiment can be applied to various devices having a communication function, for example, a computer such as a PC or a server, a portable communication device such as a portable phone or a PHS, a video/music reproducing device, a video/music recording/reproducing device, a game machine, or an imaging device.

(Program in Accordance with this Embodiment)

When a program for causing a computer to function as the receiving device in accordance with this embodiment (e.g., a program that can execute a process in accordance with the communication method in accordance with this embodiment of the receiving device, such as the aforementioned process (ii) (a process of determining the transmission target of the received transmission data) to the process (v) (a process of processing the data determined to be used for the process) is executed, it becomes possible to realize a communication system that can extend the communication distance over which the transmission data can be transmitted and cause more devices to receive the data stably.

In addition, when a program for causing a computer to function as the communication device in accordance with this embodiment (e.g., a program that can execute a process in accordance with the communication method in accordance with this embodiment of the communication device, such as the aforementioned process (2) (a process of determining the data to be used for the process from among the received communication data) and the process (3) (a process of processing the data determined to be used for the process) is executed, it becomes possible to realize a communication system that can cause more devices to receive the data stably.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although it has been described that a program (computer program) for causing a computer to function as the receiving device or the communication device in accordance with this embodiment is provided, this embodiment can also provide a recording medium having such program stored therein.

The aforementioned configurations are merely illustrative of this embodiment. Naturally, such configurations are within the technical scope of the present disclosure.

Additionally, the present technology may also be configured as below.

(1)

A communication device comprising:

a communication unit configured to receive communication data transmitted/received between a transmitting device and a receiving device that is a transmission target of transmission data transmitted by the transmitting device by unicast;

a data determination unit configured to determine data to be used for a process from among the received communication data; and a processing unit configured to process the data determined to be used for the process, wherein the processing unit, in processing the determined data, prevents the communication unit from responding to the transmitting device or the receiving device.

(2)

The communication device according to (1), wherein the data determination unit determines the data to be used for the process on the basis of identification information indicating a type of data included in the communication data.

(3)

The communication device according to (2), wherein when the communication data includes device specifying information indicating a specific device or a specific device group, and the data determination unit, if the communication device matches the device indicated by the device specifying information, or if the communication device is included in the device group indicated by the device specifying information, determines the data to be used for the process on the basis of the identification information.

(4)

The communication device according to (3), wherein the data determination unit, if the communication device does not match the device indicated by the device specifying information, and if the communication device is not included in the device group indicated by the device specifying information, does not determine the data on the basis of the identification information.

(5)

The communication device according to any one of (1) to (4), wherein the data determination unit determines content data representing an image and/or audio, and the processing unit causes the determined content data to be reproduced.

(6)

The communication device according to any one of (1) to (5), wherein the processing unit causes time information indicating a time of the communication device to be transmitted to the transmitting device, the communication unit receives the communication data including the transmission data transmitted from the transmitting device whose time has been adjusted on the basis of the time information, and the processing unit calculates a communication delay time between the communication device and the transmitting device, and processes the determined data after the calculated communication delay time has elapsed.

(7)

The communication device according to any one of (1) to (6), wherein the communication device is arranged at a position where a communication environment between the transmitting device and the communication device is better than a communication environment between the transmitting device and the receiving device.

(8)

The communication device according to any one of (1) to (5) and (7), wherein the transmission data transmitted from the transmitting device is transmission data that has been received by the transmitting device from another transmitting device and then re-transmitted to the receiving device.

(9)

The communication device according to (8), wherein the communication unit further receives communication delay time information transmitted from the other transmitting device, the communication delay time information indicating a communication delay time between the other transmitting device and the receiving device that is the transmission target of the transmission data, and the processing unit processes the determined data after the communication delay time indicated by the communication delay time information has elapsed.

(10)

The communication device according to (9), wherein the processing unit, on the basis of delay control information having set therein information indicating whether or not to use the communication delay time information, processes the determined data after the communication delay time has elapsed if the delay control information indicates that the communication delay time information is to be used.

(11)

A receiving device comprising:

a communication unit configured to receive transmission data transmitted by a transmitting device by unicast;

a relay determination unit configured to determine a transmission target of the received transmission data;

a relay processing unit configured to, when the transmission target of the transmission data includes a device other than the receiving device, cause the transmission data to be transmitted to the transmission target device; and a data determination unit configured to, when the transmission target of the transmission data includes the receiving device, determines data to be used for a process from among the received transmission data.

(12)
The receiving device according to (11), wherein
when the transmission target of the transmission data includes a device other than the receiving device, and the transmission target of the transmission data also includes the receiving device,
the processing unit processes the determined data after a relay delay time required to transmit the transmission data to the transmission target device and a communication delay time between the receiving device and the transmission target device have elapsed.

(13)
The receiving device according to (11), wherein
the processing unit causes time information indicating a time of the receiving device to be transmitted to the transmitting device,
the communication unit receives the transmission data transmitted from the transmitting device whose time has been adjusted on the basis of the time information, and
when the transmission target of the transmission data includes a device other than the receiving device and the transmission target of the transmission data also includes the receiving device, the processing unit:
calculates a communication delay time between the receiving device and the transmitting device, and
processes the determined data after a relay delay time required to transmit the transmission data to the transmission target device and the calculated communication delay time have elapsed.

(14)
A communication method comprising:
receiving communication data transmitted/received between a transmitting device and a receiving device that is a transmission target of transmission data transmitted by the transmitting device by unicast;
determining data to be used for a process from among the received communication data; and
processing the data determined to be used for the process, wherein
in processing the determined data, no response is made to the transmitting device or the receiving device.

(15)
A communication method comprising:
receiving transmission data transmitted by a transmitting device by unicast;
determining a transmission target of the received transmission data;
transmitting, if the transmission target of the transmission data includes a device other than the communication device, the transmission data to the transmission target device;
determining, if the transmission target of the transmission data includes the communication device, determines data to be used for a process from among the received transmission data; and
processing the data determined to be used for the process.

(16)
A communication system comprising:
a transmitting device;
a receiving device that is a transmission target of transmission data transmitted by the transmitting device by unicast; and
one or more communication devices configured to receive communication data transmitted/received between the transmitting device and the receiving device, wherein
each communication device includes:
a communication unit configured to receive the communication data,
a data determination unit configured to determine data to be used for a process from among the received communication data, and
a processing unit configured to process the data determined to be used for the process, and
the processing unit, in processing the determined data, prevents the communication unit from responding to the transmitting device or the receiving device.

The present disclosure contains subject matter related to that disclosed in Japanese Priority Patent Application JP 2011-078311 filed in the Japan Patent Office on Mar. 31, 2011, the entire content of which is hereby incorporated by reference.

What is claimed is:
1. A communication device comprising:
a hardware processor;
a memory comprising instructions executable by the hardware processor;
circuitry configured to:
communicate with a transmitting device and a receiving device with a communication method other than unicast;
receive communication data transmitted/received between the transmitting device and the receiving device that is a transmission target of transmission data transmitted by the transmitting device by unicast;
determine whether data to be used for a process by the communication device is included in the received communication data;
process the data to be used for the process by the communication device when the circuitry determines the data to be used for the process by the communication device is included in the received communication data; and
prevent the communication device from responding to the transmitting device, and not relay the communication data received from the transmitting device to the receiving device, when the circuitry determines the data to be used for the process by the communication device is included in the received communication data,
wherein the receiving device is arranged at a first position where a frequency of occurrence of errors in the communication between the transmitting device and the receiving device is equal to or greater than a predetermined threshold,
wherein the communication device is arranged at a second position where the frequency of occurrence of errors in the communication between the transmitting device and the communication device is less than the predetermined threshold,
wherein the second position of the communication device indicates where a communication environment between the transmitting device and the communication device is better than a communication environment between the transmitting device and the receiving device.

2. The communication device according to claim 1, wherein the circuitry determines the data to be used for the process by the communication device on the basis of identification information indicating a type of data included in the communication data.

3. The communication device according to claim 2, wherein
when the communication data includes device specifying information indicating a specific device or a specific device group,
the circuitry, if the communication device matches the specific device indicated by the device specifying information, or if the communication device is included in the specific device group indicated by the device specifying information, determines the data to be used for the process by the communication device on the basis of the identification information.

4. The communication device according to claim 3, wherein the circuitry, if the communication device does not match the specific device indicated by the device specifying information, and if the communication device is not included in the specific device group indicated by the device specifying information, determines the data on the basis of the device specifying information.

5. The communication device according to claim 1, wherein
the circuitry determines content data representing an image and/or audio, and
the circuitry causes the determined content data to be reproduced.

6. The communication device according to claim 1, wherein
the circuitry causes time information indicating a time of the communication device to be transmitted to the transmitting device,
the circuitry receives the communication data including the transmission data transmitted from the transmitting device whose time has been adjusted on the basis of the time information, and
the circuitry calculates a communication delay time between the communication device and the transmitting device, and processes the determined data after the calculated communication delay time has elapsed.

7. The communication device according to claim 1, wherein the transmission data transmitted from the transmitting device is transmission data that has been received by the transmitting device from another transmitting device and then re-transmitted to the receiving device.

8. The communication device according to claim 7, wherein
the circuitry further receives communication delay time information transmitted from the other transmitting device, the communication delay time information indicating a communication delay time between the other transmitting device and the receiving device that is the transmission target of the transmission data, and
the circuitry processes the determined data after the communication delay time indicated by the communication delay time information has elapsed.

9. The communication device according to claim 8, wherein the circuitry, on the basis of delay control information having set therein information indicating whether or not to use the communication delay time information, processes the determined data after the communication delay time has elapsed if the delay control information indicates that the communication delay time information is to be used for the process by the communication device.

10. A communication method of a communication device, the communication method comprising:
communicating with a transmitting device and a receiving device with a method other than unicast communication;
receiving, at the communication device, communication data transmitted/received between the transmitting device and the receiving device that is a transmission target or transmission data transmitted by the transmitting device by unicast;
determining whether data to be used for a process by the communication device is included in the received communication data;
processing the data to be used for the process by the communication device when the communication device determines the data to be used for the process by the communication device is included in the received communication data; and
preventing the communication device from responding to the transmitting device, and not relaying the communication data received from the transmitting device to the receiving device, when the communication device determines the data to be used for the process by the communication device is included in the received communication data,
wherein the receiving device is arranged at a first position where a frequency of errors in the communication between the transmitting device and the receiving device is equal to or greater than a predetermined threshold,
wherein the communication device is arranged at a second position where the frequency of occurrence of errors in the communication between the transmitting device and the communication device is less than the predetermined threshold
wherein the second position of the communication device indicates where a communication environment between the transmitting device and the communication device is better than a communication environment between the transmitting device and the receiving device.

11. A communication system comprising:
a transmitting device;
a receiving device that is a transmission target of transmission data transmitted by the transmitting device by unicast; and
one or more communication devices configured to receive communication data transmitted/received between the transmitting device and the receiving device by unicast, wherein each communication device includes:
circuitry configured to:
communicate with the transmitting device and the receiving device with a communication method other than unicast;
receive the communication data,
determine whether data to be used for a process by the communication device is included in the received communication data, process the data to be used for the process by the communication device when the circuitry determines the data to be used for the process by the communication device is included in the received communication data, and
prevent the communication device from responding to the transmitting device, and not relay the communication data received from the transmitting device to the receiving device, when the circuitry determines the data to be used for the process by the communication device is included in the received communication data,
wherein the receiving device is arranged at a first position where a frequency of errors in the communication between the transmitting device and the receiving device is equal to or greater than a predetermined threshold,
wherein the communication device is arranged at a second position where the frequency of occurrence of errors in the communication between the transmitting device and the communication device is less than the predetermined threshold
wherein the second position of the communication device indicates where a communication environment between the transmitting device and the communication device is better than a communication environment between the transmitting device and the receiving device.

* * * * *